//www.oac10101010101010101010101010101010101010
US005725455A

United States Patent [19]
Kamada et al.

[11] Patent Number: 5,725,455
[45] Date of Patent: Mar. 10, 1998

[54] FORWARD CLUTCH AND LOCKUP CLUTCH CONTROL IN AN AUTOMATIC TRANSMISSION CONTROL SYSTEM

[75] Inventors: Shinya Kamada; Kenji Sawa; Hiroshi Shinozuka, all of Hiroshima; Tomoo Sawazaki, Higashihiroshima; Koichi Yamamoto, Hiroshima; Kazushi Kurokawa, Hiroshima; Takamichi Teraoka, Hiroshima; Masakazu Hombo, Hiroshima; Naotaka Hirami, Hiroshima; Yasunori Kanda; Akinobu Aoki, both of Higashihiroshima; Tatsuhiko Iwasaki, Aki-gun; Takeyoshi Kawa, Hiroshima, all of Japan

[73] Assignee: Mazda Motor Corporation, Hiroshima-ken, Japan

[21] Appl. No.: 593,620

[22] Filed: Jan. 30, 1996

[30] Foreign Application Priority Data

| Jan. 31, 1995 | [JP] | Japan | 7-036256 |
| Mar. 7, 1995 | [JP] | Japan | 7-047244 |
| Mar. 31, 1995 | [JP] | Japan | 7-100005 |
| Dec. 29, 1995 | [JP] | Japan | 7-354275 |

[51] Int. Cl.[6] .................................................. F16H 61/00
[52] U.S. Cl. ........................... 477/62; 74/733.1; 477/168
[58] Field of Search ............................. 74/732.1, 733.1; 475/65; 192/3.58, 3.61; 477/62, 63, 168, 174

[56] References Cited

U.S. PATENT DOCUMENTS

| 2,749,775 | 6/1956 | Simpson | 475/65 |
| 4,431,095 | 2/1984 | Suga | 192/3.58 X |
| 4,441,385 | 4/1984 | Taga et al. | 475/65 X |
| 4,603,601 | 8/1986 | Nishikawa et al. | 74/733.1 X |
| 5,179,874 | 1/1993 | Hunter | 74/733.1 |
| 5,383,379 | 1/1995 | Niiyama | 74/733.1 |
| 5,417,622 | 5/1995 | Asayama et al. | 74/733.1 X |

FOREIGN PATENT DOCUMENTS

| 4419033 | 1/1994 | Germany . |
| 4431892 | 9/1995 | Germany . |
| 531031 | of 1993 | Japan . |

*Primary Examiner*—Khoi Q. Ta
*Attorney, Agent, or Firm*—Sixbey, Friedman, Leedom & Ferguson, P.C.; Gerald J. Ferguson, Jr.; Donald R. Studebaker

[57] ABSTRACT

A hydraulic control system for an automatic transmission having at least a forward clutch which is unlocked in a fourth gear and locked in other forward gears and a lock-up clutch for coupling input and output elements of a torque converter together is equipped with a pressure control valve for controlling operating pressure for the forward clutch, a lock-up control valve for connecting and disconnecting the first valve from the lock-up clutch, a pressure line through which control source pressure is introduced into the forward clutch while the first valve is in communication with the lock-up clutch, and a shift valve for discharging the control source pressure from the pressure line.

15 Claims, 26 Drawing Sheets

Fig. 16 1ST GEAR

2ND GEAR

REVERSE GEAR (FAIL SAFE)

2ND GEAR (LOCK-UP)

FORWARD CLUTCH AND LOCKUP CLUTCH CONTROL IN AN AUTOMATIC TRANSMISSION CONTROL SYSTEM

BACKGROUND OF THE INVENTION

1. Field of the Invention

The present invention relates to an automatic transmission control system for an automatic transmission, and, more particularly, to a hydraulic pressure control system for an automatic transmission, having a plurality of friction coupling elements operative with hydraulic pressure which is provided, regulated and delivered by means of electrically operated pressure control means.

2. Description of Related Art

Typically, an automatic transmission for an automobile has a torque converter and a transmission gear mechanism driven by the torque converter. Such a transmission gear mechanism includes a plurality of friction coupling elements, such as clutches and brakes, which in turn are selectively locked or coupled and unlocked or released so as thereby to place automatically the automatic transmission into desired gears according to driving conditions. Selectively locking and unlocking those friction coupling elements is performed by means of hydraulic pressure control systems. In recent years, it is typical in such a hydraulic pressure control system to incorporate electrically operated pressure control means, such as duty solenoid valves and linear solenoid valves, for providing, regulating and delivering hydraulic pressure with which the friction coupling elements are operated, with an effect of minute pressure control during gear shifts and reduced shift shocks which always provide improved feelings of gear shifts.

The torque converter, is a fluid coupling device of the type which multiplies engine torque. Such a torque converter unavoidably allows slippage, even at cruising speeds, due to the fact that the only connection between pump and turbine or input and output shafts is the transmission fluid. This slippage leads to a decrease in torque transmission efficiency. To prevent this slippage action, and thus improve torque transmission efficiency, a number of converters are equipped with a lock-up feature. A lock-up unit, disposed between input and output shafts of the torque converter (i.e. an engine output shaft and a turbine shaft), mechanically couples the turbine and pump, more specifically the engine output shaft and turbine shaft, together when activated so as to avoid or restrain slippage in a cruising condition where it is not so serious to multiply engine torque and absorb torque fluctuations. Locking and unlocking the lock-up clutch are governed by means of the hydraulic pressure control system as well as locking and unlocking the friction coupling elements.

As is well known in the art, the transmission mechanism incorporates what is called a forward clutch the as one of friction coupling elements put into action. Typically, this forward clutch is equipped with a one way clutch which is controlled to lock in a forward range but run idle in a specific high speed gear, for instance a fourth gear in a four forward speed automatic transmission. Thus, the forward clutch couples the turbine of the torque converter to a specific one of the gear elements of the transmission gear mechanism so as to transmit engine torque in the forward gears, excluding the specific gear, and is held coupled by means of the one-way clutch running idle so as to be free from torque transmission in the specific gear.

In cases where the utilization is made of electrically operated pressure control means for the purpose of both control of operating pressure for the forward clutch and control of slippage of the torque converter with an intention of improving the performance of an automatic transmission including an increase in power transmission efficiency which always leads to improved fuel efficiency and satisfied feelings of gear shifts, there is a necessity that the pressure control means must be installed to each friction coupling element, which is always undesirable in an angle of harness wiring and space and cost efficiency.

An approach to eliminate those problems, such as known from, for instance, Japanese Patent Publication No. 5(1993)-31031, is to install a single electromagnetic valve as a pressure control means which is used for locking and unlocking control of both forward clutch and lock-up clutch.

In an attempt to realize structurally simplified and low cost automatic transmissions, it has been proposed to avoid the utilization of the one-way clutch which runs idle in a specific high speed gear, for instance the fourth gear in four forward speed automatic transmissions.

While the disuse of the one-way clutch is easily achieved by organizing automatic transmissions such that a forward clutch is unlocked in the specific gear, a serious constraint is imposed on such an automatic transmission in which the utilization is made of a single pressure control means for locking and unlocking control of both forward clutch and lock-up clutch. That is to say, the single pressure control means must be switched in operating condition not only between for the forward clutch and for lock-up clutch but also between high speed gears and low speed gears in connection with the forward clutch. This makes it difficult to perform operation control of the pressure control means and control of supply of line pressure to the pressure control means. Specifically, in the case where the single pressure control means is utilized commonly by a plurality of friction coupling elements which have different locking and unlocking control, control is required to unlock one friction coupling element while leaving another friction coupling element locked or to lock the one friction coupling element while leaving the other friction coupling element unlock. There has been a strong demand for a simplified structure of hydraulic pressure control systems achieving that directly-opposed control.

SUMMARY OF THE INVENTION

It is an object of the present invention to provide a hydraulic pressure control system simplified in structure for an automatic transmission, which can achieve opposed control of two friction coupling elements.

The foregoing object of the present invention is accomplished by providing a hydraulic pressure control system for an automatic transmission of the type having a torque converter and a plurality of friction coupling elements which are selectively operated with hydraulic pressure to provide desired gears, the friction coupling elements including at least a specific friction coupling element which is locked in a specific forward gear and unlocked in gears other than the specific forward gear and a lock-up clutch which mechanically couples input and output shafts of the torque converter together. The automatic transmission control system includes a pressure control means for controlling operating pressure with which the specific friction coupling element is locked, a lock-up control valve for connecting and disconnecting pressure communication of the pressure control means from the lock-up clutch, a control source pressure supply means through which control source pressure is introduced into the specific friction coupling element as the operating pressure while the lock-up control valve connects pressure communication of the pressure control means with the lock-up clutch, and a switching means for disconnecting communication of the control source pressure from the specific friction coupling element for a gear shift from the specific gear to any one of the other gears.

Specifically, the switching means disconnects communication of the operating pressure from the specific friction coupling element to unlock the specific friction coupling element while the lock-up control valve connects pressure communication of the pressure control means with the lock-up clutch before a gear shift from the specific gear to any one of the other gears. The pressure control means discharges the operating pressure from the specific friction coupling element to unlock the specific friction coupling element while the lock-up control valve disconnects pressure communication of the pressure control means with the lock-up clutch before a gear shift from the specific gear to any one of the other gears. The lock-up control valve disconnects pressure communication of the pressure control means from the lock-up clutch during a gear shift from any one of the other gears to the specific forward gear.

In the case where a forward clutch is employed as the specific friction coupling element and installed so as to be locked in first, second and third gears and unlocked in a fourth gear, the lock-up clutch is locked in the second gear, the third gear and the fourth gear according to specified driving conditions.

Utilization is made of the lock-up control means operative commonly to the two friction coupling elements, such as the forward clutch and the lock-up clutch such that the lock-up control means connects the pressure control means, which essentially provides operating pressure for the specific friction coupling element, to the lock-up clutch by means of control of operations of the specific friction coupling element and lock-up clutch. The control source pressure supply means enables the specific friction coupling element to receive control source pressure during the communication of the operating pressure with the lock-up clutch. Accordingly, during the specific gear shift, the switching means enables the pressure control means to control the lock-up clutch while holding the specific friction coupling element locked with the control source pressure. Further, the utilization of the switching means enables gear shifts to gears other than the specific gear. The switching means discharges or releases the operating pressure from the specific friction coupling element to unlock it and control the lock-up clutch during these other gear shifts. Summarizing the above, in the automatic transmission control system of the invention, the utilization is made of only one pressure control means in order to enable control of the operating pressure for the specific friction control element during a gear shift and, after the gear shift, control of the lock-up clutch while holding the specific friction control element locked or unlocked even in gear shifts to the specific gear.

Resultingly, in addition to the realization of the attempt to provide a structurally simplified and low cost automatic transmissions control system, the automatic transmissions control system provides minute control of a timing at which the operating pressure is supplied to or discharged from the specific friction coupling element, in particular, during gear shifts, and highly precise control of the lock-up clutch, improving the performance of an automatic transmission including power transmission efficiency, which always leads to improved fuel efficiency, and feelings of gear shifts.

Since, when a gear shift is made to one of the other gears from the specific gear after having unlocked the specific friction coupling element, the switching means allows discharge of the control source pressure if the lock-up clutch is controlled or has been locked by means of the pressure control means before the gear shift, the gear shift is achieved without any difficulty even during controlling of the lock-up clutch. Together, since, when a gear shift is made to one of the other gears from the specific gear after having unlocked the specific friction coupling element, the pressure control means allows discharge of the control pressure from the specific friction control element if the lock-up clutch is not controlled or has been unlocked by means of the pressure control means before the gear shift, minute control of a timing at which the specific friction element is discharged is achieved. Further, gear shifts to the specific gear are achieved while holding the lock-up clutch unlocked. Consequently, improvement of the performance of an automatic transmission including power transmission efficiency, which always leads to improved fuel efficiency, and feelings of gear shifts is achieved. With the control system in which the pressure control means controls satisfactorily the first friction coupling element, i.e. the forward clutch, gear shifts from the specific gear having the necessity of unlocking the forward clutch are also provided satisfactorily even in an automatic transmission with the forward clutch not accompanied by an one-way clutch. This also leads to the automatic transmissions control system simplified in structure.

According to the automatic transmissions control system in which operating pressure regulated by the second pressure generating means is selectively delivered through the first switching means to the first and second friction coupling means, such as a forward clutch and a lock-up clutch, respectively, only one additional pressure generating means enables control or regulation of pressure for both first and second friction coupling elements, and hence locking and unlocking control of the first and second friction coupling elements. While the first switching means connects communication of the operating pressure regulated by the second pressure generating means with the second friction coupling element, communication of the operating pressure regulated by the first pressure generating means is connected to the first friction coupling element by means of the second switching means. This enables the second pressure generating means to control unlocking the second friction coupling element while the first friction coupling element is held locked.

In other words, during a gear shift from one gear to another, the operating pressure is supplied to or discharged from the forward clutch under regulation by the second pressure generating means, resulting in timely locking or unlocking the forward clutch. Since the first pressure generating means can provide the operating pressure necessary to hold the forward clutch locked in, in particular, second and third gears, the second pressure generating means is enabled to regulate the operating pressure for the lock-up clutch. As a result, the lock-up clutch can provide lock-up, unlock and slippage control for the torque converter in the forth gear where the forward clutch is unlocked, as well as in the second and third gear.

According to the automatic transmission control system in which the first spool valve, such as a duty solenoid valve, delivers the operating pressure regulated by the second pressure generating means selectively to the first and second friction coupling elements such as a forward clutch and a lock-up clutch, respectively, since, the first spool valve allows communication of the fixed level of pressure from the first pressure generating means with the first friction coupling element, while providing communication of the operating pressure regulated by the second pressure generating means with the second friction coupling element, locking or unlocking control of the second friction coupling element is enabled by the second pressure generating means while the first friction coupling element is held locked.

Further, the second spool valve, such as a duty solenoid valve, is operative between the first operative position where communication of the specified level of pressure is connected to the first friction coupling element and the second operative position where communication of the specified level of pressure is disconnected from the second spool valve while discharging the operating pressure from the first friction coupling element, locking control of the second friction coupling element is provided by means of the second pressure generating means while the first friction coupling element is locked or unlocked. Since the utilization of one pressure generating means capable of pressure regulation and two spool valve enables locking control of the first friction coupling element and locking control of the second friction control element while locking or unlocking the first friction coupling element, the automatic transmission control system is simplified in structure. Specifically, the forward clutch as the first friction coupling element is locked and unlocked at a satisfactory timing during gear shifts from one to another, and the lock-up clutch is controlled to lock and unlock the torque converter and allow slippage of the torque converter, while the forward clutch is held locked in the second and third gears or while it is held unlocked in the fourth gear.

BRIEF DESCRIPTION OF THE DRAWINGS

The above and other objects and features of the present invention will be clearly understood from the following description with respect to a preferred embodiment thereof when considered in conjunction with the accompanying drawings, wherein same reference numerals have been used throughout the drawings to denote the same or similar elements, and in which.

DETAILED DESCRIPTION OF THE PREFERRED EMBODIMENTS

It is to be noted that the term "left end" position used in the following description shall means and refer to one of operative positions of a valve that the valve spool occupies at the left as viewed in figures, and the term "right end" position used in the following description shall means and refer to another operative position of the valve that the valve spool occupies at the right as viewed in figures.

Figure 1:
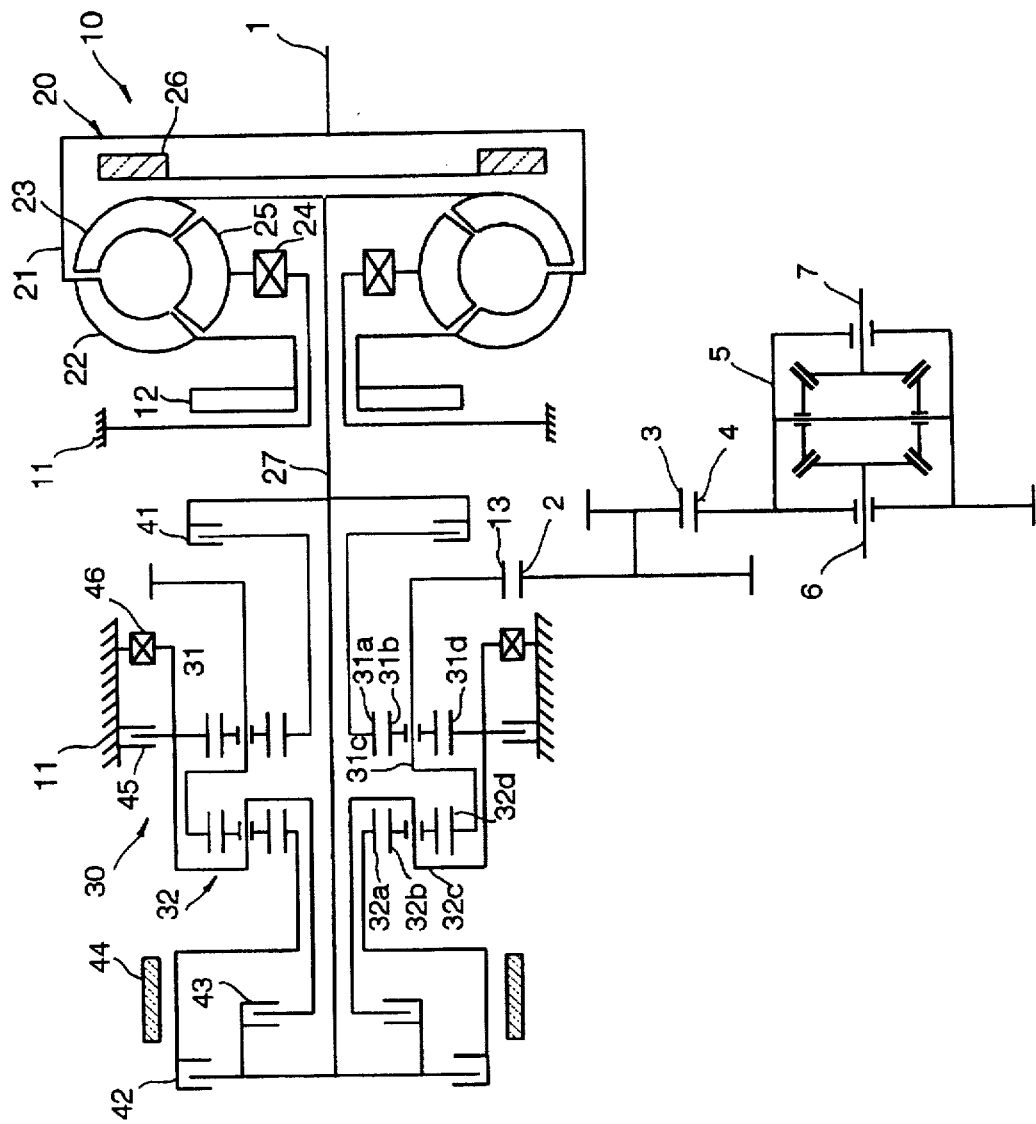
FIG. 1 is a schematic illustration of an automatic transmission incorporating a hydraulic control system of the present invention.
Figure 2:
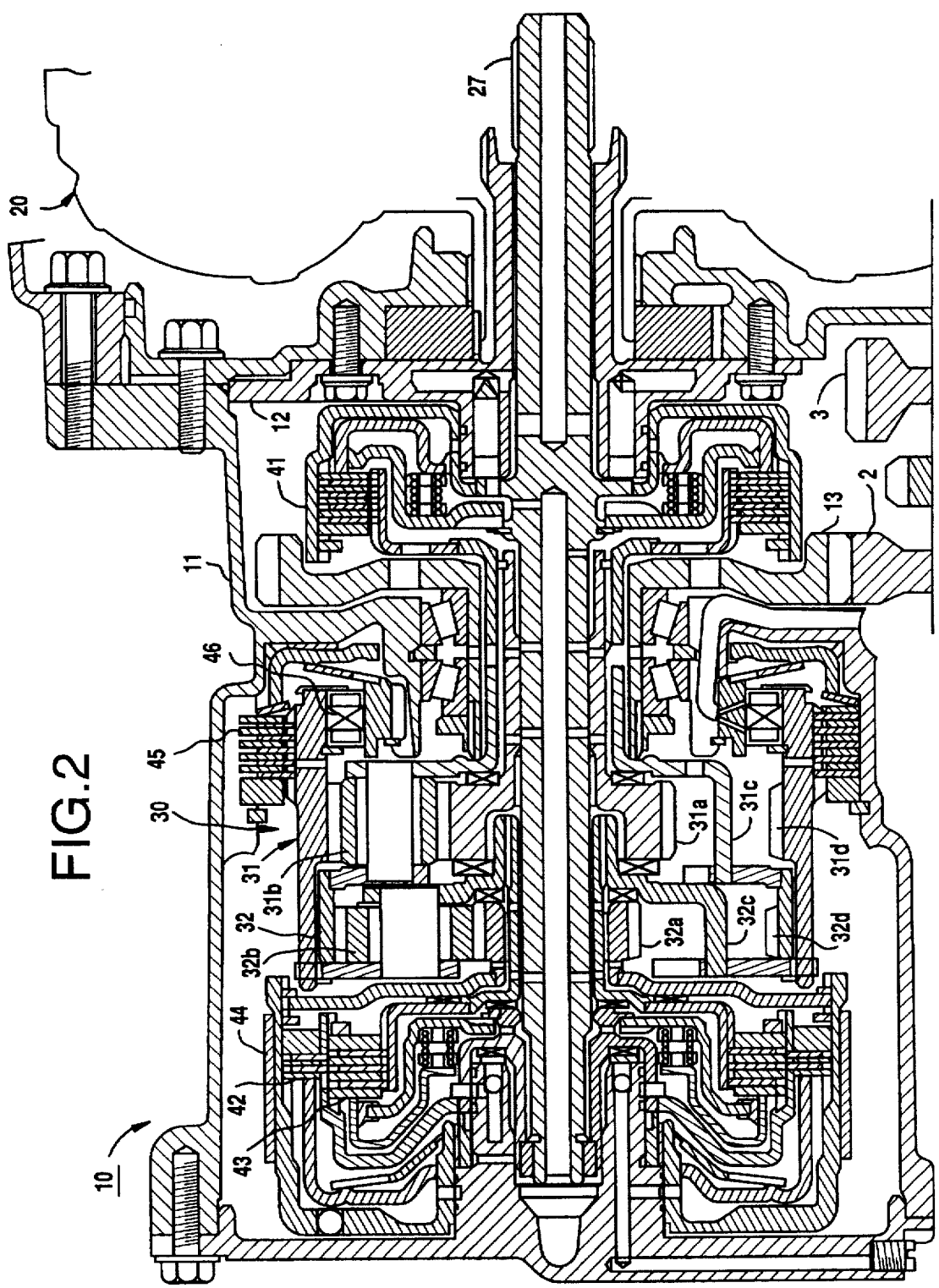
FIG. 2 is a cross-sectional view of the automatic transmission shown in FIG. 1.

Referring to the drawings in detail, FIGS. 1 and 2 show an overall structure of an automatic transmission 10 equipped with a torque converter which incorporates a hydraulic pressure control system in accordance with a preferred embodiment of the present invention. The automatic transmission 10 has a mechanical configuration including, as main components, a torque converter 20, a transmission gear mechanism 30 operationally coupled to and driven by means of the torque converter 20, a plurality of friction coupling elements 41–45, such as clutches and brakes, and a one-way clutch 46. These friction coupling elements and one-way are selectively coupled and uncoupled by the hydraulic pressure control system to change power transmission paths of the transmission gear mechanism 30 so as to place the automatic transmission into desired gears and ranges, namely first (1) to fourth (4) forward gears in a drive (D) range, a second speed (S) range and a low speed (L) range, and a reverse gear in a reverse (R) range.

The torque converter 20 has a pump 22, a turbine 23 and a stator 25. The pump 22 is placed within and secured to an transmission housing 11 secured to an engine output shaft 1. The turbine 23 is placed within the transmission housing 11 so as to face the pump 22 and driven by the pump 22 by means of a special lightweight oil. The stator 25 is inserted between the pump 22 and turbine 23 and mounted on the transmission housing 11 through a one-way clutch 24 so as to multiply engine torque. The torque converter 20 further has a lock-up clutch 26 placed between a converter housing 21 and the turbine 23 for mechanically locking the engine shaft 1 and turbine 23 together when it is activated. The torque converter 20 thus structured performs transmission of turbine rotation to the transmission gear mechanism 30 through a turbine shaft 27. Behind the torque converter 20, i.e. on one side of the torque converter 20 opposite to the engine 1, there is provided an oil pump 12 driven by the engine output shaft 1 through the housing 21 of the torque converter 20.

The transmission gear mechanism 30 comprises a first planetary gearset 31 and a second planetary gearset 32. The first planetary gearset 31 is comprised of a sun gear 31a, a plurality of pinion gears 31b in mesh with the sun gear 31a, a pinion carrier 31c for carrying the pinion gears 31b, and a ring gear 31d in mesh with the pinion gears 31b. Similarly, the second planetary gearset 32 is comprised of a sun gear 32a, a plurality of pinion gears 32b in mesh with the sun gear 32a, a pinion carrier 32c for carrying the pinion gears 32b, and a ring gear 32d in mesh with the pinion gears 32b. The automatic transmission gear mechanism 30 includes a forward clutch (FWD) 41 disposed between the turbine shaft 27 and the sun gear 31a of first planetary gearset 31, a reverse clutch (REV) 42 disposed between the turbine shaft 27 and the sun gear 32a of second planetary gearset 32, a 3–4 clutch (3–4C) 43 disposed between the turbine shaft 27 and the pinion carrier 32c of second planetary gearset 30, and a 2–4 brake (2–4B) 44 for locking the sun gear 32a of second planetary gearset 32. Further, a low-reverse brake (L/R) 45 and a one-way clutch (OWC) 46 are disposed in parallel with each other between the transmission housing 11 and the ring gear 31d of the first planetary gearset 31 connected to the pinion carrier 32c of the second planetary gearset 32. A transmission output gear 13 is connected to the pinion carrier 31c of the first planetary gearset first 31 which in turn is connected to the ring gear 32d of second planetary gearset 32. Rotation of is transmitted to right and left axles 6 and 7 from the transmission output gear 13 through a differential 5 via intermediate gears 3 and 4.

The frictional coupling elements 41–45 and one-way clutch 46 are selectively locked and unlocked so as to place the automatic transmission 10 into available gears as shown in the following Table I. In Table I, a frictional coupling element is locked in a gear indicated by a circle; a frictional coupling element is locked in a gear indicated by a circle in parentheses but in a low-speed (L) range only; and a friction coupling element (the 2–4 brake 44) is not locked in a gear indicated by a dark spot as a result of both servo apply pressure chamber (S/A) and servo release pressure chamber (S/R) being filled with hydraulic pressure as will be described later.

TABLE I

| Gear | FWD(41) | 2-4B(44) | | 3-4C(43) | L/R(45) | REV(42) | OWC(46) |
| | | S/A | S/R | | | | |
|---|---|---|---|---|---|---|---|
| 1ST | O | | | | (O) | | O |
| 2ND | O | O | | | | | |
| 3RD | O | ● | O | O | | | |
| 4TH | | O | | O | | | |
| REVERSE | | | | | | O | O |

Specifically, the forward clutch (FWD) 41 locks in the first, second and third gears; the reverse gear (REV) 42 locks in the reverse gear; the 2–4 brake (2–4B) 44 locks in the second and fourth gears; and the low reverse brake (L/R) 45 locks in the reverse gear and in the first gear in the low speed (L) range where engine brake is available.

In gears, where simultaneously locking of two of the friction coupling elements 41–45, such as locking of the 3–4 clutch 43 and low reverse brake 45, locking of the low reverse brake 45 and 2–4 brake 44, and locking of the 2–4 brake 44 and reverse clutch 42, will cause, what is called "interlocking" causes in the automatic transmission 10. In order for the automatic transmission 10 to be reliably prevented from interlocking, the hydraulic pressure control system includes only one shift valve which will be described in detail later.

Figure 3:
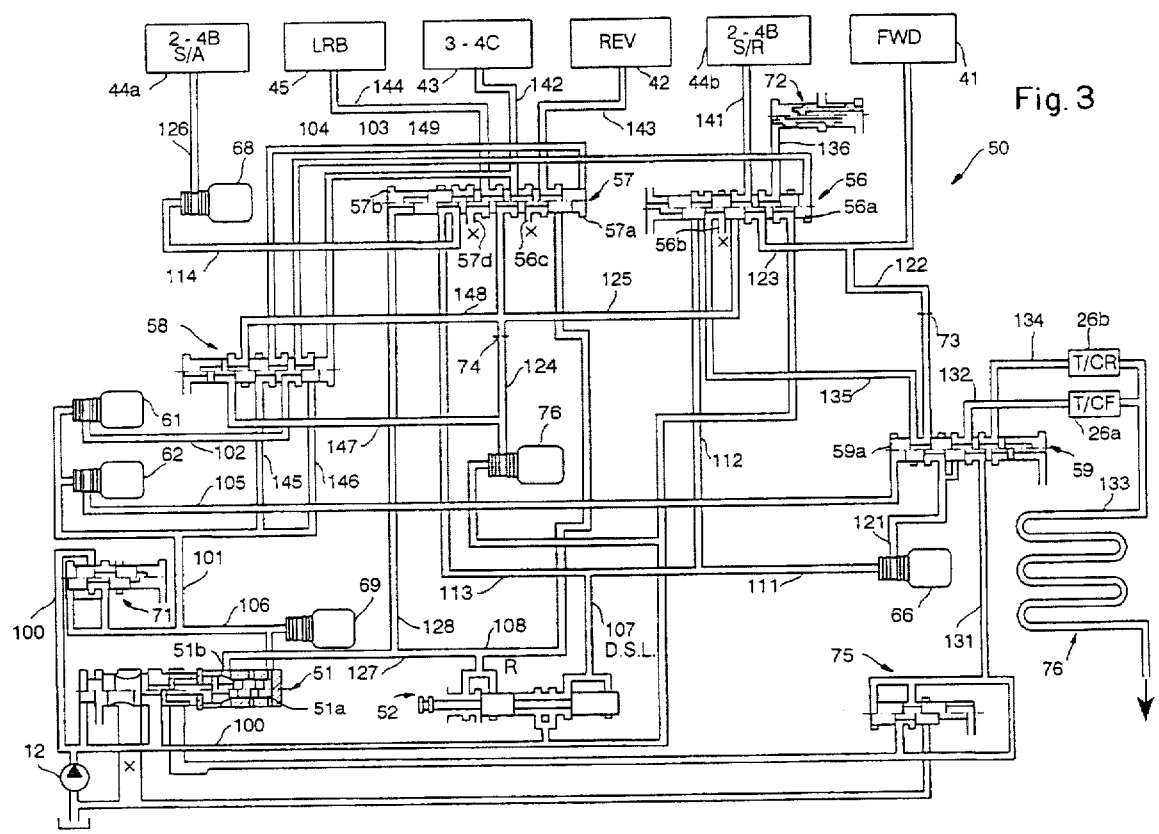
FIG. 3 is a diagrammatic view of a hydraulic pressure control circuit according to an embodiment of the present invention.

The following description will be directed to a hydraulic pressure control circuit or system 50 shown in FIG. 3 for controlling operating pressure supply to and operating pressure discharge from a pressure chamber of each friction coupling element 41–45.

One of the friction coupling elements 41–45, specifically the 2–4 brake (2–4B) 44 including a band brake in this hydraulic pressure control system 50, has a servo apply pressure chamber (S/A) 44a and a servo release pressure chamber (S/R) 44b to which operating pressure is supplied. The 2–4 brake (2–4B) 44 locks when the operating pressure is supplied to the servo apply pressure chamber (S/A) 44a only, and unlocks when the operating pressure is not supplied to both pressure chambers (S/A and S/R) 44a and 44b, when the operating pressure is supplied to both pressure chambers (S/A and S/R) 44a and 44b, or when the operating pressure is supplied to the servo release pressure chamber (S/R) 44b only. All other friction coupling elements 41–43 and 45 have single pressure chambers and lock when operating pressure is supplied to the related pressure chambers.

As shown in FIG. 3, a hydraulic pressure control circuit 50 includes various valves as essential elements, such as a regulator valve 51 for generating a line pressure (control source pressure), a manual shift valve 52 for shifting ranges of the automatic transmission 10 according to manual range selections through a shift lever, first to third shift valves 56–58 for changing pressure lines according to gears, first and second solenoid valves 61 and 62 (which are hereafter referred to as 1st and 2nd SVs, respectively, for simplicity in the drawings) utilized to control a lock-up control shift valve 59, first to third duty solenoid valves 66–68 (which are hereafter referred to as 1st, 2nd and 3rd DSVs, respectively, for simplicity in the drawings) utilized as operating pressure control means to generate, regulate and deliver operating pressure to the pressure chambers of friction coupling elements 41–45. These duty solenoid valves 66–68 as the operating pressure supply means are utilized with the effect of accurate regulation of operating pressure for the friction coupling elements 41–45 and, in particular, precise timing control of supply and discharge of operating pressure during gear shifts, which yield a reduction in shift shock caused in the automatic transmission and, consequently, improve feelings of gear shifting. In this instance, those solenoid valves 61 and 62 and duty solenoid valves 66–68 are of a three-way type having operating modes, namely a communication mode where hydraulic pressure is allowed to flow in a pressure line from the upstream side to the downstream side and vice versa and a drain mode where hydraulic pressure is drawn from the downstream pressure line. In the drain mode, since the valve shuts off its related upstream pressure line during draining hydraulic pressure from the downstream pressure lines, there is no aimless drainage of hydraulic pressure from the upstream pressure line, decreasing driving loss of the oil pump 12. As is well known, each of the solenoid valves 61 and 62 opens the downstream pressure line when it is ON or is applied with electric current and brings the upstream and downstream pressure lines into communication with each other when it is OFF or is not applied with electric current. On the other hand, each of the duty solenoid valves 66–68 develops a specifically regulated level of hydraulic pressure in the downstream pressure line according to a given level of line pressure in the upstream pressure line by means of duty control.

The regulator valve 51 regulates operating pressure discharged by the oil pump 12 to a fixed level of line pressure which in turn is delivered to the manual shift valve 52 through a main pressure line 100 and also to a reducing valve 71 and the second duty solenoid valve 67 as control source pressure. Further, as described later, according to operated conditions of the first shift valve 56 which in turn serves as a switching means for connecting and disconnecting transmission of pressure, the line pressure is supplied to an accumulator 72 used to lock the forward clutch 41 through the shift valve 56 as back pressure. The line pressure is reduced by the reducing valve 71 to a fixed pressure level and then, delivered to the first and second solenoid valves 61 and 62 through a pressure line 101. When the first and second solenoid valves 61 and 62 are OFF, the fixed level of line pressure is further delivered downstream as solenoid pressure. Specifically, when the first solenoid valve 61 is OFF, the solenoid pressure is delivered as pilot pressure to the control port 56a of first shift valve 56 through pressure lines 102 and 104 via the third shift valve 58 or to the control port 57a of second shift valve 57 through pressure line 102 and 103 via the third shift valve 58. As a result, these shift valves 56 and 57 place their spool in left end positions as viewed in FIG. 3. On the other hand, when the first solenoid valve 62 is OFF, the solenoid pressure is directed to the control port 59a of lock-up control shift valve 59 through a pressure line 105 and places its spool in the right end position as viewed in FIG. 3.

Further, the fixed level of operating pressure from the reducing valve 71 is also delivered to the regulation port 51a of regulator valve 51 through a pressure line 106. In this instance, the operating pressure is regulated according to, for instance, engine load by means of a linear solenoid valve 69 installed in the pressure line 106. In this way, the line pressure is regulated according to engine load by means of the regulator valve 51. The line pressure delivered to the manual shift valve 52 through the main pressure line 100 is directed to a forward pressure line 107 in the forward ranges, i.e. the drive (D) range, slow speed (S) range and low speed (L) range, or to a reverse pressure line 108 in the reverse (R) range. The forward pressure line 107 branches off into three pressure lines 111–113, the first pressure line 111 leading to the first duty solenoid valve 66, which in turn serves as a pressure control means, so as to supply the line pressure as control source pressure; the second pressure line 112 leading to the first shift valve 56 so as to supply the line pressure to it; and the third pressure line 113 being brought into communication with a pressure line 114 so as to supply the line pressure as control source pressure to the third duty solenoid valve 68 when the second shift valve 57 has placed its spool in the left end position.

A pressure line 121 downstream from the first duty solenoid valve 66 which is supplied with control source pressure at the upstream side thereof leads to the lock-up control shift valve 59 and is brought into communication with the pressure chamber of forward clutch 41 through a forward clutch pressure line 122 equipped with an orifice 73 when the lock-up control shift valve 59 has placed its spool in the right end position. In this connection, a pressure line 123 branching off from the forward clutch pressure line 122 is connected to the first shift valve 56. A pressure line 124 downstream from the second duty solenoid valve 67 is equipped with an orifice 74 and leads to the second shift valve 57 and to the first shift valve 56 through a pressure line 125 branching off from the pressure line 124. A servo apply pressure line 126 downstream from the third duty solenoid valve 68 leads to the servo-apply pressure chamber 44a.

The reverse pressure line 108, into which the line pressure is introduced through the manual shift valve 52 in the reverse (R) range, leads to the second shift valve 57 so as to deliver the line pressure to the second shift valve 57. In this instance, the reverse pressure line 108 also delivers the line pressure to the intensifying port 51 of regulator valve 51 so as to regulate the line pressure to a level generally higher in the reverse (R) range than in the forward ranges. A pressure line 128 branching off from the pressure line 127 leads to the control port 57b of second shift valve 57 so as to deliver the line pressure to the second shift valve 57 as pilot pressure for forcing it to place its spool in the right end position.

The lock-up control shift valve 59 is supplied with operating pressure through a torque converter pressure line 131 via a relief valve 75 from the regulator valve 51 and is connected to the pressure line 121 downstream from the first duty solenoid valve 66. Further, the lock-up control shift valve 59 is supplied at its control port 59a with pilot line pressure through the pressure line 105 via the solenoid valve 62. While the solenoid valve 62 has been OFF, the pilot pressure forces the lock-up control shift valve 59 to place its spool in the right end position, bringing the torque converter pressure line 131 into communication with a pressure line 132 leading to a front pressure chamber (T/CF) 26a of the lock-up clutch 26 so as to supply operating pressure to the front pressure chamber (T/CF) 26a, thereby unlocking the lock-up clutch 26. Simultaneously, the pressure line 121 downstream from the duty solenoid valve 66 is brought into communication with the forward clutch pressure line 122 through the lock-up control shift valve 59 with a result of supplying operating pressure regulated by the first duty solenoid valve 66 to the pressure chamber of forward clutch 41 through the forward clutch pressure line 122. As apparently shown in FIG. 3, outlets of both front pressure chamber (T/CF) 26a and rear pressure chamber (T/CR) 26b of lock-up clutch 26 are connected with each other by means of a pressure relief line 133 equipped with an oil cooler 76.

When the second ON-OFF valve 62 is ON, operating pressure is drained out from the control port 59a of lock-up control shift valve 59 through the pressure line 105. Resultingly, the lock-up control shift valve 59 shifts its spool to the left end position, so as to bring the torque converter pressure line 131 into communication with a pressure line 134 leading to the rear pressure chamber (T/CR) 26b of lock-up clutch 26, thereby forcing the operating pressure into the rear pressure chamber (T/CR) 26b of lock-up clutch 26 and locking the lock-up clutch 26. Simultaneously, the pressure line 132 leading to the rear pressure chamber 26b (T/CR) of lock-up clutch 26 is brought into communication with the pressure line 121 downstream from the first duty solenoid valve 66 through the lock-up control shift valve 59, enabling the first duty solenoid valve 66 to regulate the operating pressure in the rear pressure chamber 26b of lock-up clutch 26. As a result, the lock-up clutch 26 is controlled precisely in locked condition, which is always desirable to effectively increase power transmission performance of the torque converter 20.

A source pressure line 135, which is installed between the lock-up control shift valve 59 and first shift valve 56, is brought into communication with the forward clutch pressure line 122 through the lock-up control shift valve 59 while the lock-up control shift valve 59 has placed its spool in the left end position, i.e. the first duty solenoid valve 66 has been in communication with the pressure line 132. Further, the source pressure line 135 is brought into communication with the pressure line 112 branching off from the forward pressure line 107 through the first shift valve 56 while the first shift valve 56 has placed its spool in the left end position, and with the drain port 56b of first shift valve 56 while the first shift valve 56 has placed its spool in the right end position.

In the hydraulic pressure control circuit 50 of this embodiment, the first shift valve 56 is connected to the accumulator 72 through a pressure line 136 as well as being connected to the pressure line 123 branching off from the forward clutch pressure line 122. While the first shift valve 56 places its spool in its left end position, the pressure line 136 is in communication with the branch pressure line 123 so as to force the accumulator 72 to discharge the pressure into the pressure chamber of forward clutch 41. That is, accumulation of pressure in the accumulator 72 and the discharge of accumulated pressure to the forward clutch 41 are managed by shifting the spool of first shift valve 56. The first shift valve 56 is connected to the servo release pressure chamber 44b of 2–4 brake 44 through a servo release pressure line 141. The servo release pressure chamber 44b of 2–4 brake 44 and the pressure chamber of forward clutch 41 are brought into communication through the forward clutch pressure line 122, pressure lines 123 and 141 and simultaneously supplied with operating pressure when the first shift valve 56 shift its spool to the right end position. Further, the first shift valve 56 and second shift valve 57 are interconnected by means of the pressure lines 124 and 125. The servo release pressure chamber 44b of 2–4 brake 44, leading to the first shift valve 56, and the pressure chamber of 3–4 clutch 43 leading to the second shift valve 57 through a 3–4 clutch pressure line 142 are brought into communication with each other through the pressure lines 141, 142, 124 and 125 when both first shift valve 56 and second shift valve 57 shift their spool to their left end positions, respectively. Causing the first shift valve to shift the spool in position changes communication of the servo release pressure chamber 44b of 2–4 brake 44 between with the forward clutch 44 and with the 3–4 clutch 43.

The second shift valve 57 is connected with the reverse clutch 42 and the low reverse brake 45 through a reverse clutch pressure line 143 and a low reverse brake pressure line 144, respectively, as well as being connected to the servo apply pressure chamber 44a of 2–4 brake 44 through the pressure lines 114 and 126 via the third duty solenoid valve 68. Accordingly, the 2–4 brake 44 receives at the servo apply pressure chamber 44a servo apply pressure directly from the third duty solenoid valve 68. While the second shift valve 57 has placed its spool in the left end position, it keeps the 3–4 clutch 43 in communication with second duty solenoid valve 67 through the pressure lines 124 and 142 and provides communication between the pressure lines 113 and 114, supplying operating pressure to the third duty solenoid valve 68. During this, both reverse clutch 42 and low reverse brake 45 are connected to the drain ports 57c and 57d of second shift valve 57, respectively. On the other hand, while the second shift valve 57 has placed its spool in the right end position, it keeps the pressure chamber of reverse clutch 42 in communication with the reverse pressure line 108 as well as connecting the low reverse brake 45 to the second duty solenoid valve 67 through the pressure lines 124 and 144. In this instance, the 3–4 clutch 43 and the servo apply pressure chamber of 2–4 brake 44 are connected to the drain ports 57c and 57d of second shift valve 57, respectively.

As described above, the second shift valve 57 has the drain port 57a common to pressure chambers of 3–4 clutch 43 and reverse clutch 42 for pressure discharge and the drain port 57b common to the pressure chamber of low reverse brake 45 and the servo apply pressure chamber 44a of 2–4 brake 44 for pressure discharge. This structure of second shift valve 57 makes it possible to install a shortened axial length of second shift valve 57 as compared with cases where the shift valve 57 is provided with drain ports peculiar to the respective friction coupling elements 41–45.

As was previously described, while, in gears where simultaneously locking of two of the friction coupling elements 41–45, namely the 3–4 clutch 43 and low reverse brake 45, the low reverse brake 45 and 2–4 brake 44, and the 2–4 brake 44 and reverse clutch 42, will occur, interlocking causes in an automatic transmission, nevertheless, the hydraulic pressure control circuit 50 of this invention prevents the automatic transmission 10 from interlocking, which results from changing pressure lines with the use of a single shift valve, i.e. the second shift valve in this embodiment. Specifically stating, when the 3–4 clutch 43 or 2–4 brake 44 is locked, which occurs while the second shift valve 57 has placed its spool in the left end position, both low reverse brake 45 and reverse clutch 42 are simultaneously unlocked. When the low reverse brake 45 or reverse clutch 42 is locked, which occurs while the second shift valve 57 has placed its spool in the right end position, the 3–4 clutch 43 and 2–4 brake 44 are simultaneously unlocked. In such a way, the interlocking of the automatic transmission 10 is certainly prevented by changing pressure lines with the use of the second shift valve 57 which is realized by a relatively simple structure.

Supply of operating pressure to two friction coupling elements which are not simultaneously locked, namely the 3–4 clutch 43 and low reverse brake 45, is performed through the selective connection of second duty solenoid valve 67 to the two friction coupling elements caused by shifting the spool of second shift valve 57, enabling to provide a simple structure of the hydraulic pressure control circuit 50.

While the second shift valve 57 is supplied at the control port 57b with the control source pressure through the pressure lines 127 and 128 from via the manual shift valve 52, it is also supplied at another control port 57a with the solenoid pressure from the first solenoid valve 61 through the pressure lines 102 and 104 via the third shift valve 58. The second shift valve 57 is forced to shift its spool with pilot pressure at either one of the control ports 57a and 57b, selectively providing operative pressure lines.

The third shift valve 58 is connected at the upstream side with pressure lines 145 and 146 branching off from the pressure line 101 leading to the reducing valve 71 and a line pressure 147 branching off from the pressure line 124 downstream from the second duty solenoid valve 67, as well as the pressure line 102. Together, the third shift valve 58 is connected at the downstream side with the pressure line 148 leading to the pressure line 125 upstream from the first shift valve 56 and a line pressure 149 branching off from the 3–4 clutch pressure line 142 extending between the second shift valve 57 and 3–4 clutch 43, as well as the pressure lines 103 and 104. While the third shift valve 58 has placed its spool in the right end position, it keeps the pressure line 146 in communication with the pressure line 103, directing the fixed level of pilot pressure to the first shift valve 56 from the reducing valve 71 so as to cause the first shift valve 56 to shift its spool to the left end position. At this time, the second shift valve 57 is brought into communication with the first solenoid valve 61 through the pressure lines 102 and 104, allowing the solenoid pressure from the first solenoid valve 61 to be directed to the second shift valve 57 as pilot pressure.

When the second shift valve 57 receives the pilot pressure at the control port 57a, it shifts its spool to the left end position and, as a result, brings the 3–4 clutch 43 into communication with the second duty solenoid valve 67 through the pressure lines 124 and 142. Resultingly, while operating pressure is supplied to the pressure chamber of 3–4 clutch 43 from the second duty solenoid valve 67. When the operating pressure exceeds a fixed level, the pilot pressure rises at the control port 58a of third shift valve 58, forcing the third shift valve 58 to shift the spool to the left end position. Resultingly, the pressure line 145 is brought into communication with the pressure line 103, directing the fixed level of pilot pressure to the control port 57a of second shift valve 57 from the reducing valve 71. At this time, the first solenoid valve 61 is brought into communication with the control port 56a of first shift valve 56 through the pressure lines 102 and 104 and, as a result, allows the solenoid pressure from the first solenoid valve 61 to be directed to the first shift valve 56 as pilot pressure.

As stated above, it can be summarized that the 3–4 clutch 43 is a friction coupling element which is locked in forward gears higher than the third gear and unlocked in gears lower than the second gear and that the first shift valve 56 is one which shifts between gears lower than the third gear where the forward clutch 41 is locked and the forth gear in which forward clutch 41 is unlocked, in other words, in a range of high speed gears. The second shift valve 57 shifts with a result of locking and unlocking the low reverse brake 45. That is, it is a shift valve which shifts between the second gear and the first gear in which engine brake is available, in other words, in a range of low speed gears. Consequently, these first shift valve 56 and second shift valve 57 do not operate in any way simultaneously.

By means of selectively connecting the first solenoid valve 61 to the control ports 56a and 56b of first shift valve 56 according to operated conditions of 3–4 clutch 43 which is differently operated between the high speed gears higher than the third gear and the low speed range lower than the second gear, it is enabled to supply solenoid pressure the shift valves 56 and 57 so as to operate them at a most appropriate timing and to use a single element, i.e. the solenoid valve 61, for shift operations of the shift valves 56 and 57. In other words, the first solenoid valve 61 is used commonly to the first shift valve 56 and second shift valve 57 which are in no way simultaneously operative, enabling to provide a simple structure of the hydraulic pressure control circuit 50.

As was stated previously, the pressure line 125, which is brought into communication with the pressure line 141 through which the first shift valve 56 is connected to the servo release pressure chamber 44b of 2–4 brake 44 when the first shift valve 56 shifts its spool to the left end position, branches off from the pressure line 124 which extends from the second duty solenoid valve 67 to the second shift valve 57 and is equipped with the orifice 74. Further, the pressure line 125 is connected to the pressure line 148 leading to the third shift valve 58. When a first to second gear shift occurs, in other words, when operating pressure is supplied to the servo apply pressure chamber 44a of 2–4 brake 44 and is simultaneously discharged from the servo release pressure chamber 44b of 2–4 brake 44, the 3–4 clutch 43 is in no way supplied with operating pressure and the third shift valve 58 is not supplied at the control port 58a with pilot pressure, so that the third shift valve 58 holds the spool in the right end position, thereby keeping the pressure lines 147 and 148 in communication with each other. As a result, the operating pressure discharged from the servo release pressure chamber 44b through the pressure lines 141 and 125 runs not through the orifice 74 but through the pressure lines 148 and 147. It can accordingly be said that the pressure lines 147 and 148 form a bypass pressure line with regard to the orifice 74. Discharge of operating pressure from the servo release pressure chamber 44b is made quickly through the bypass pressure line 147 and 148, preventing a delay of operation of 2–4 brake in response to a gear shift which occurs due to residual operating pressure in the servo release pressure chamber 44b.

During a second to third gear shift, i.e. when operating pressure is supplied to the servo release pressure chamber 44b of 2–4 brake 44, the operating pressure is introduced through the orifice 74. In this case, operating pressure is supplied to both servo release pressure chamber 44b of 2–4 brake 44 and pressure chamber of 3–4 clutch 43 at approximately the same level with the effect of providing comfortable feelings of gear shift. Shifting the third shift valve 58 necessary to directing operating pressure to the bypass pressure line 147 and 148 is caused by the operating pressure in the pressure chamber of 3–4 clutch 43 which is free from the first to second gear shift. Specifically, the third shift valve 58 is configured so that it shifts the spool in position to shut off the bypass pressure line 147 and 148 at a time when the operating pressure reaches a level slightly higher than a piston thrust force level for the 3-4 clutch 43. With the configuration, during the second to third gear shift, after the 3-4 clutch 43 and 2-4 brake 44 start their locking and unlocking operations resulting from the completion of a piston stroke of the 3-4 clutch 43, the orifice 74 is involved in the supply of operating pressure to the servo release pressure chamber 44b of 2-4 brake 44, causing smooth shift operations of the 2-4 brake 44 and 3-4 clutch 43 with the effect of providing comfortable feelings of gear shift.

During the first to second gear shift, the operating pressure is discharged quickly from the servo release pressure chamber 44b of 2-4 brake 44. In this instance, while there is possibly a part of operating pressure impermanently left over in the servo release pressure chamber 44b of 2-4 brake 44 which in turn potentially reaches the control port 58a of third shift valve 58 through the pressure lines 125, 124 and 149 via the second shift valve 57, however, since the operating pressure necessary for the third shift valve 58 to make the bypass pressure line 147 and 148 function is set higher in level than the piston thrust force level, the residual pressure does not give any effect to the third shift valve 58. This is because that, during the shift operations of the 3-4 clutch 43 and 2-4 brake 44, the operating pressure is developed so as to be held in both servo release pressure chamber 44b of 2-4 brake 44 and pressure chamber of 3-4 clutch 43 at approximately the same level and that, during the first to second gear shift, the third shift valve 58 is shifted in operative position at a timing set most suitably to be prevented from shutting off the bypass pressure line 147 and 148 which is caused by accidental shift operation due to the residual operating pressure in the servo release pressure chamber 44b of 2-4 brake 44.

Figure 4:
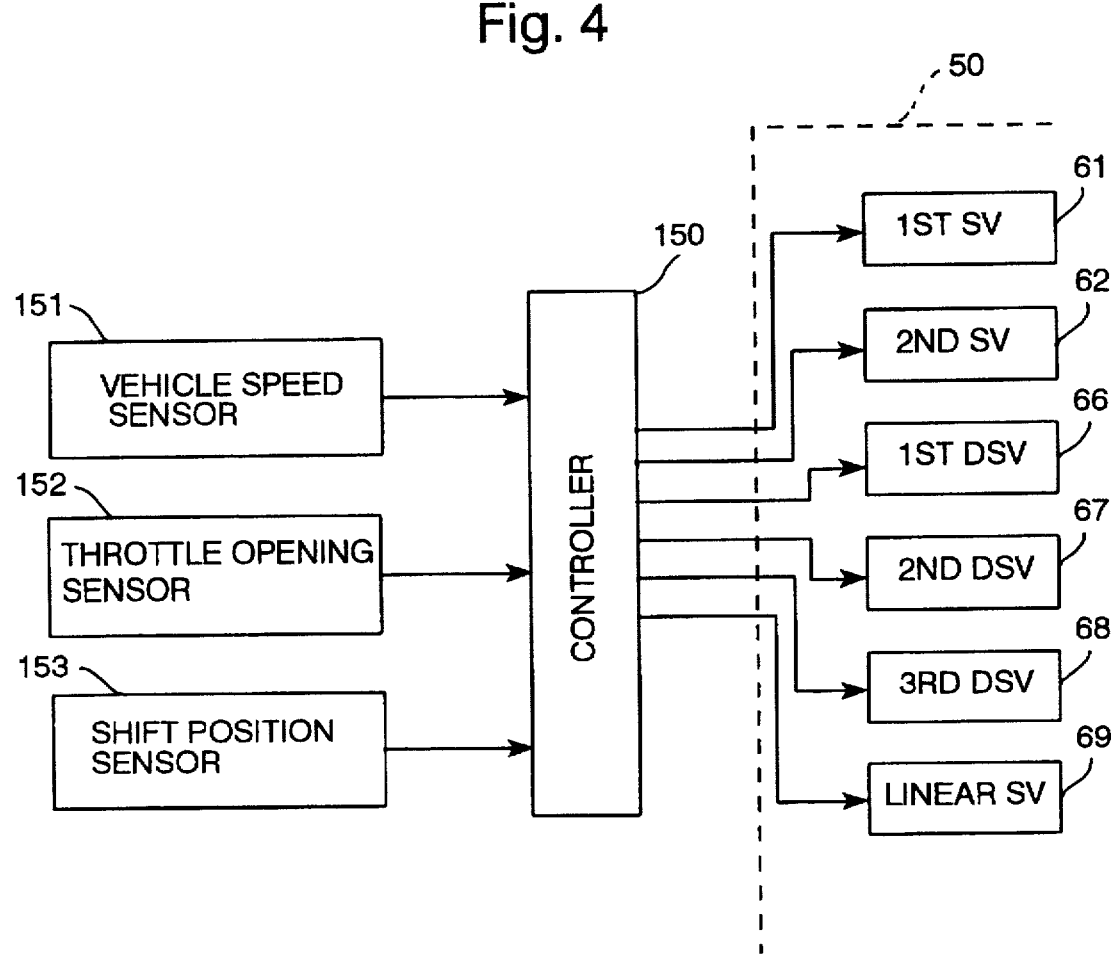
FIG. 4 is a block diagram illustrating a control system for various solenoid valves of the hydraulic control circuit of FIG. 3.

As shown in FIG. 4, the hydraulic pressure control circuit 50 cooperates with a controller 150 for controlling operations of the valves 61, 62 and 66–69. The controller 150 receives various control signals, such as a signal representative of a vehicle speed from a speed sensor 151, a signal representative of engine throttle position or opening as an engine load from a throttle opening sensor 152, and a signal representative of a shift position or range selected by a shift lever from a position sensor 153, on the basis of which the controller 150 controls the various valves 61, 62 and 66–69 according to engine operating conditions.

The following description will be directed to operation of the valves 61, 62 and 66–68 in connection with operating pressure supply to the friction coupling elements 41–45 in each gear shift.

The valves 61, 62 and 66–68 operate in various patterns for the respective gears as shown in the following Tables II-VI. The Tables II, III and IV indicate patterns for up-shift, down-shifts and a down-shift to the first gear in the low speed (L) range, respectively. Further, the Tables V and VI indicates patterns for range selection through the manual shift valve 52 and lock-up control in the third gear and fourth gear, respectively. In each Table II-VI, a circle indicates the ON or activated state of each valve 61, 62, 66–68 in which a pressure line upstream is shut off to drain operating pressure out of a downstream pressure line of each related valve; a cross or X indicates the OFF or deactivated state of each valve 61, 62, 66–68 in which an upstream pressure line and downstream pressure line from each related valve are in communication with each other so as to allow operating pressure to be directed to the downstream pressure line; and a dark spot indicates that each duty solenoid valve 66–68 regulates source control pressure to a fixed level and directs it downstream. PL, Pacc, Ptc denote line pressure or control source pressure, accumulator pressure and converter pressure, respectively, and P1, P2 and P3 denote operating pressure regulated by the first, second and third duty solenoid valves 66, 67 and 68, respectively. Further, an arrow indicates a direction of gear shift or a direction of range shift. For instance, 3→4 indicates a gear shift from the third gear to the fourth gear; and N←D indicates a range shift from the drive (D) range to the neutral (N) range. In Table VI, a label L/U indicates a lock-up control condition.

TABLE II

| Gear | 1 | 1→2 | 2 | 2→3 | 3 | 3→4 | 4 |
|---|---|---|---|---|---|---|---|
| FWD | PL | PL | PL | PL | PL | — | — |
| S/A | — | P3 | PL | P3 | PL | P3 | PL |
| S/R | — | — | — | P2 | PL | — | — |
| 3-4 | — | — | — | P2 | PL | PL | PL |
| L/R | — | — | — | — | — | — | — |
| REV | — | — | — | — | — | — | — |
| T/CF | Ptc | Ptc | Ptc | Ptc | Ptc | Ptc | Ptc |
| T/CR | Ptc | Ptc | Ptc | Ptc | Ptc | Ptc | Ptc |
| 1st SV | X | X | X | X | X | O | O |
| 2nd SV | X | X | X | X | X | X | X |
| 1st DSV | X | X | X | X | X | O | O |
| 2nd DSV | O | O | O | ● | X | X | X |
| 3rd DSV | O | ● | X | ● | X | ● | X |

TABLE III

| Gear | 1 | 1←2 | 2 | 2←3 | 3 | *3←4 | **3←4 | 4 |
|---|---|---|---|---|---|---|---|---|
| FWD | PL | PL | PL | PL | PL | Pacc | PL | — |
| S/A | — | P3 | PL | P3 | PL | P3 | P3 | PL |
| S/R | — | — | — | P2 | PL | PL | PL | — |
| 3-4 | — | — | — | P2 | PL | PL | PL | PL |
| L/R | — | — | — | — | — | — | — | — |
| REV | — | — | — | — | — | — | — | — |
| T/CF | Ptc | Ptc | Ptc | Ptc | Ptc | Ptc | Ptc | Ptc |
| T/CR | Ptc | Ptc | Ptc | Ptc | Ptc | Ptc | Ptc | Ptc |
| 1st SV | X | X | X | X | X | X | O | O |
| 2nd SV | X | X | X | X | X | X | X | X |
| 1st DSV | X | X | X | X | X | X | O | O |
| 2nd DSV | O | O | O | ● | X | X | X | X |
| 3rd DSV | O | ● | X | ● | X | ● | ● | X |

*: Power ON shift; **: Power OFF shift

TABLE IV

| Gear | L1 | L1←2 | 2 |
|---|---|---|---|
| FWD | PL | PL | PL |
| S/A | — | — | PL |
| S/R | PL | P2 | — |
| 3-4 | — | — | — |
| L/R | PL | P2 | — |
| REV | — | — | — |
| T/CF | Ptc | Ptc | Ptc |
| T/CR | Ptc | Ptc | Ptc |
| 1st SV | O | O | X |
| 2nd SV | X | X | X |
| 1st DSV | X | X | X |
| 2nd DSV | X | ● | O |
| 3rd DSV | O | O | X |

TABLE V

| Gear | N | N→D(3) | D(1) | N←D | N→R | R |
|---|---|---|---|---|---|---|
| FWD | — | Pacc | Pacc | PL | Pacc | — | — |
| S/A | — | — | — | — | — | — | — |
| S/R | — | P2 | — | — | — | — | — |
| 3-4 | — | P2 | — | — | — | — | — |

TABLE V-continued

| Gear | N | N→D(3) | D(1) | N←D | N→R | R |
| --- | --- | --- | --- | --- | --- | --- |
| L/R | — | — | — | — | — | P2 | PL |
| REV | — | — | — | — | — | PL | PL |
| T/CF | Ptc | Ptc | Ptc | Ptc | Ptc | Ptc | Ptc |
| T/CR | Ptc | Ptc | Ptc | Ptc | Ptc | Ptc | Ptc |
| 1st SV | X | X | X | X | X | X | X |
| 2nd SV | X | X | X | X | X | X | X |
| 1st DSV | X | ● | ● | X | X | X | X |
| 2nd DSV | O | ● | O | O | O | ● | X |
| 3rd DSV | O | O | O | O | O | O | O |

TABLE VI

| Gear | 3 | 3←→3L/U | 3L/U | 4 | 4←→4L/U | 4L/U |
| --- | --- | --- | --- | --- | --- | --- |
| FWD | PL | PL | PL | — | — | — |
| S/A | PL | PL | PL | PL | PL | PL |
| S/R | PL | PL | PL | — | — | — |
| 3-4 | PL | PL | PL | PL | PL | PL |
| L/R | — | — | — | — | — | — |
| REV | — | — | — | — | — | — |
| T/CF | Ptc | P1 | — | Ptc | P1 | — |
| T/CR | Ptc | Ptc | Ptc | Ptc | Ptc | Ptc |
| 1st SV | X | X | X | O | O | O |
| 2nd SV | X | O | O | X | O | O |
| 1st DSV | X | ● | O | O | ● | O |
| 2nd DSV | X | X | X | X | X | X |
| 3rd DSV | X | X | X | X | X | X |

Figure 5:
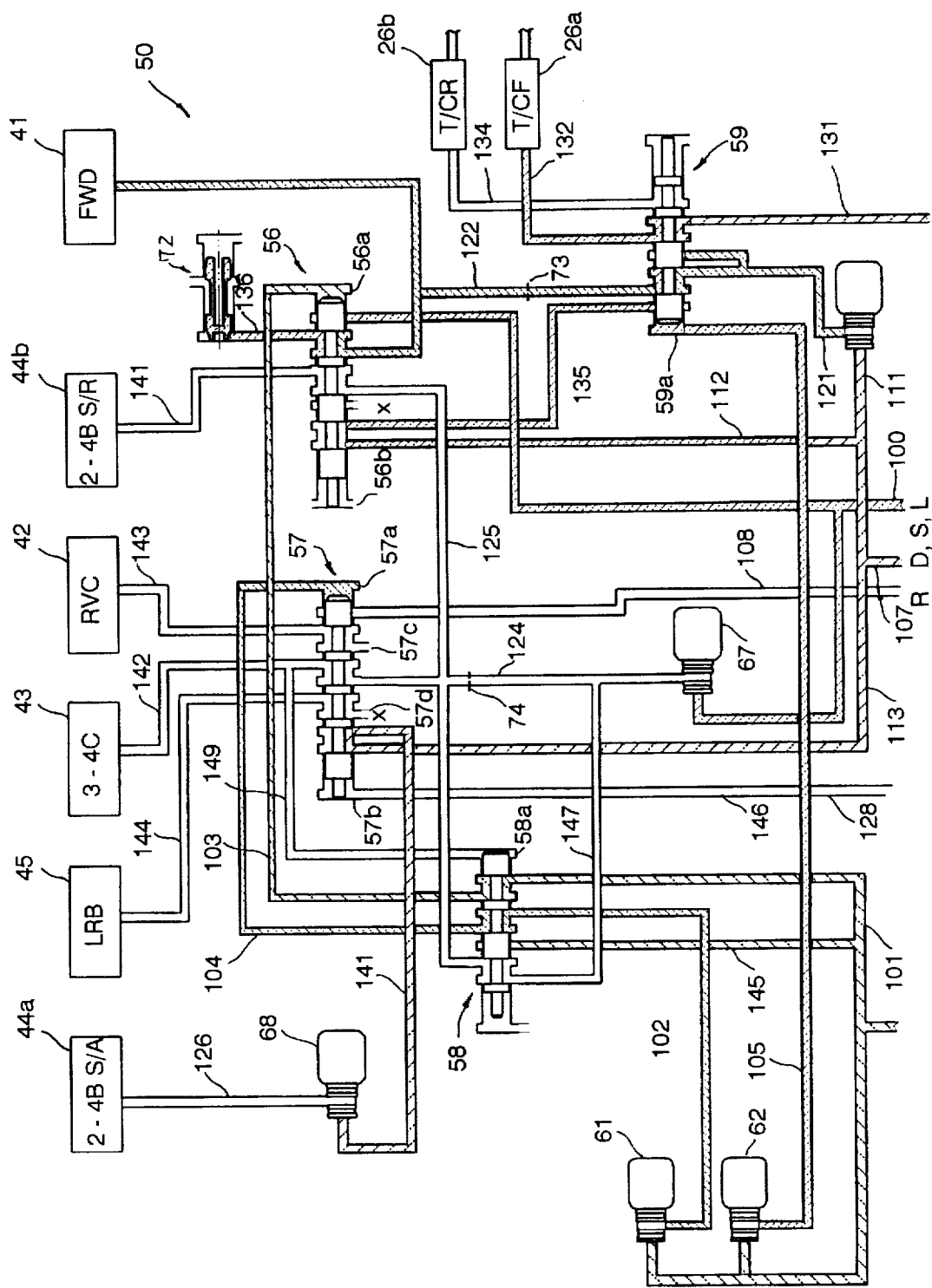
FIG. 5 is an enlarged view of an essential part of the hydraulic pressure control circuit of FIG. 3 which provides a first gear.

As shown in Tables II and III and in FIG. 5, in the first (1) gear in forward ranges excepting the low-speed (L) range, the second solenoid valve 62 is OFF, directing the pilot pressure to the control port 59a of lock-up control valve 96 through the pressure line 105. This causes the lock-up control shift valve 59 to shift its spool to the right end position as viewed in FIG. 5, bringing the pressure line downstream from the first duty solenoid valve 66 into communication with the forward clutch pressure line 122. On the other hand, the second duty solenoid valve 66 is OFF, directing the line pressure directly to the pressure chamber of forward clutch (FWD) 41, so as to lock the forward clutch (FWD) 41 into coupling engagement. At the beginning, the line pressure is supplied gently to the forward clutch (FWD) 41 through the orifice 73. Together, the converter pressure is supplied to the front chamber (T/CF) 26a of lock-up clutch 26 through the pressure line 131, unlocking the lock-up clutch 26.

Further, in the first (1) gear, the second duty solenoid valve 67 is turned ON, draining the control port 58a of third shift valve 58 through the pressure lines 124, 142 and 149. As a result, the third shift valve 58 shifts its spool to the right end position, bringing the pressure line 146 into communication with the pressure line 103 so as to supply a fixed level of pressure to the control port 56a of first shift valve 56 through the pressure lines 101, 146 and 103 from the reducing valve 71 (see FIG. 3). Resultingly, the first shift valve 56 shifts its spool to the right end position, bringing the pressure line 123 branching off from the forward clutch pressure line 122 into communication with the pressure line 136 leading to the accumulator 72. The locking of the forward clutch 41 during, for instance, a shift from the neutral (L) to the drive (D) progresses gently due to the operation of the accumulator 72. The combined effects of the accumulator 72 and orifice 73 reduces shift shock occurring in the automatic transmission.

In the first (1) gear where the first solenoid valve 61 is OFF, the pilot pressure is supplied to the control port 57a of second shift valve 57 through the pressure lines 102 and 104 via the third shift valve 58, forcing the second shift valve 57 to shift the spool to the left end position. As a result, the pressure line 114 leading to the third duty solenoid valve 68 is brought into communication with the forward pressure line 107 leading to the, so that, although the line pressure is supplied to the third duty solenoid valve 68 having been ON and drained at the downstream side, it prevents the line pressure from being delivered to the servo apply pressure chamber (S/A) 44a of 2-4 brake 44.

Figure 6:
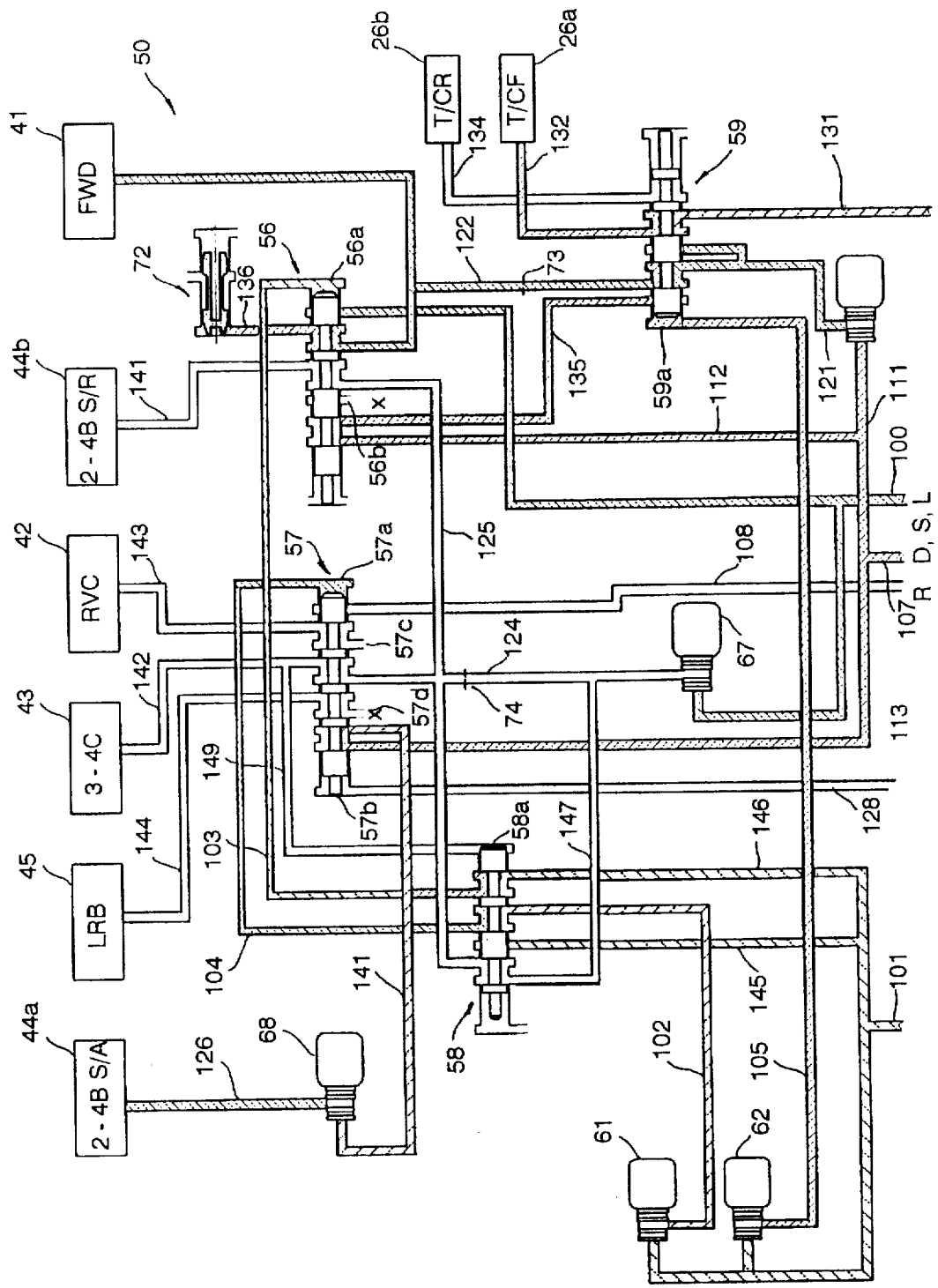
FIG. 6 is an enlarged view of an essential part of the hydraulic pressure control circuit of FIG. 3 which provides a second gear.

As shown in Tables II and III and in FIG. 6, in the second (2) gear, the third duty solenoid valve 68 turns OFF, directing the line pressure directly to the servo apply pressure chamber (S/A) 44a of 2-4 brake 44 through the pressure lines 107, 114 and 126 via the second shift valve 57. The remaining valves 61, 62 66 and 67 hold the same states as in the first (1) gear. Resultingly, the 2-4 brake (2-4B) 44, in addition to the forward clutch (FWD) 41, is locked. As shown in Table II, in a transitional pattern (1→2) between the first (1) gear and second (2) gear, since the third duty solenoid valve 68 duty-controls the servo apply pressure and supplies it to the 2-4 brake (2-4B) 44, the locking of 2-4 brake (2-4B) 44 is smooth. After the achievement of shift to the second (2) gear, the third duty solenoid valve 68 terminates the control of line pressure and supplies the line pressure directly to the servo apply pressure chamber (S/A) 44a of 2-4 brake 44. In this instance, the third shift valve 58 has been placed its spool in the right end position and, consequently, holds the bypass pressure lines 147 and 148 in communication so as to form the pressure bypass line, the operating pressure is released not through the orifice 74 but through the bypass pressure line 147 and 148 during the first (1) to second (2) gear shift. This prevents a shift delay which is possibly caused by residual pressure left in the servo release pressure chamber (S/R) 44b of 2-4 brake 44.

As shown in Table III, during a down-shift from the second (2) gear to first (1) gear, the same transitional pattern as during the up-shift from the first (1) gear to second (2) gear takes place.

Figure 7:
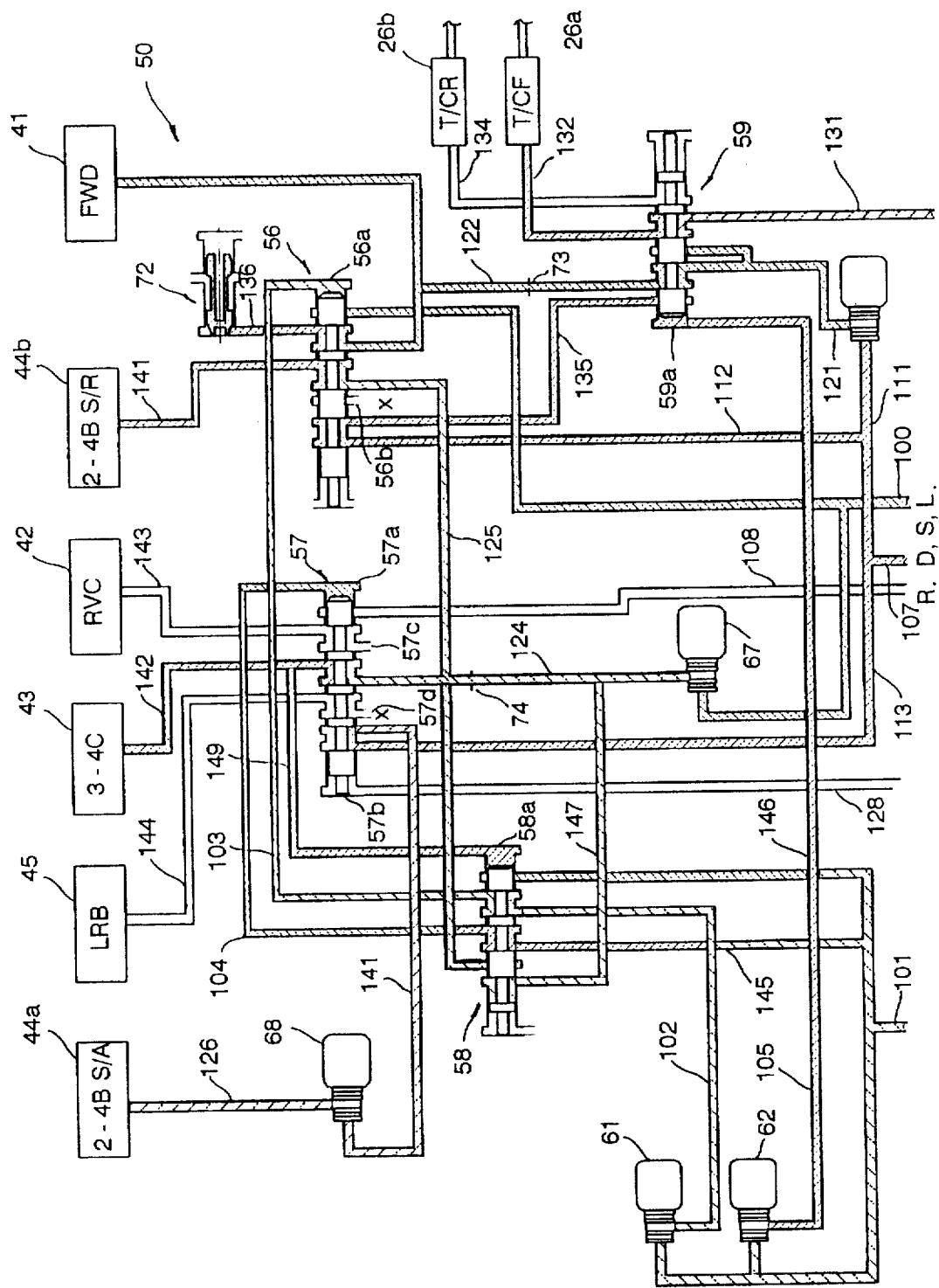
FIG. 7 is an enlarged view of an essential part of the hydraulic pressure control circuit of FIG. 3 which provides a third gear.

As shown in Tables II and III and in FIG. 7, in the third (3) gear, the second duty solenoid valve 67 takes the OFF state, delivering the line pressure directly to the first shift valve 56 and second shift valve 57 through the pressure line 125 and 124, respectively, from the main pressure line 100, and forces these shift valve to shift their spool to the left end positions, respectively. As a result, the line pressure is supplied to both pressure chamber of 3-4 clutch 43 and the servo release pressure chamber (S/R) 44b of 2-4 brake 44 through the pressure line 142 and 141, respectively, locking, on one hand, the 3-4 clutch 43 and unlocking, on the other hand, the 2-4 brake 44. The remaining valves 61, 62 66 and 68 hold the same states as in the second (2) gear.

In a transitional pattern (2→3) between the second (2) gear and third (3) gear, since the second duty solenoid valve 67 duty-controls operating pressure on the basis of the line pressure from the main pressure line 100 and directs it to the first shift valve 56 and second shift valve 57 through the pressure lines 125 and 124, respectively. Because these pressure lines 124 and 125 leads to the 3-4 clutch pressure line 142 and servo release pressure line 141, respectively, the operating pressure regulated by the second duty solenoid valve 67 is supplied to both pressure chamber of 3-4 clutch 43 and the servo release pressure chamber (S/R) 44b of 2-4 brake 44 as 3-4 clutch pressure and servo release pressure, respectively. The locking of 3-4 clutch 43 and the unlocking of 2-4 brake 44 are caused favorably.

During the second (2) to third (3) gear shift, while the second duty solenoid valve 67 duty-controls the 3-4 clutch pressure and servo release pressure, the third duty solenoid valve 68, through which the line pressure was supplied to the servo apply pressure chamber (S/A) 44a of 2–4 brake 44 in the second (2) gear, duty-controls the servo apply pressure. Consequently, the locking of 3–4 clutch 43 and the unlocking of 2–4 brake 44 are timely caused with well reduced shift shock. At this time, since communication has been provided between the pressure chamber of 3–4 clutch 43 and servo release pressure chamber (S/R) 44b of 2–4 brake 44, the operating pressure regulated by the second duty solenoid valve 67, after adjustment in supply timing by the orifice 74, is delivered to both pressure chamber of 3–4 clutch 43 and servo release pressure chamber (S/R) 44b of 2–4 brake 44 and held at approximately the same level in these pressure chambers.

Although the third shift valve 58 holds its spool in the right end position so as to provide the bypass pressure line 147 and 148 in the second (2) gear immediately before the second (2) to third (3) gear shift, the third shift valve 58, as was previously described, forces the spool to the left end position when the 3–4 clutch pressure raises and reaches slightly above the piston thrust force level, so as to disconnect the pressure lines 147 and 148 and shut off them as the bypass pressure line. Accompanying this, the pressure line 102 is changed in communication from with the pressure line 104 to with the pressure line 103. Resultingly, while the pilot pressure is directed to the control port 56a of first shift valve 56 from the first solenoid valve 61, the fixed level of pressure is directed to the control port 57a of second shift valve 57 through the pressure lines 145 and 104 from the reducing valve 71.

As shown in Table III, during a down-shift from the third (3) gear to second (2) gear, the same transitional pattern as during the up-shift from the second (2) gear to third (3) gear.

Figure 8:
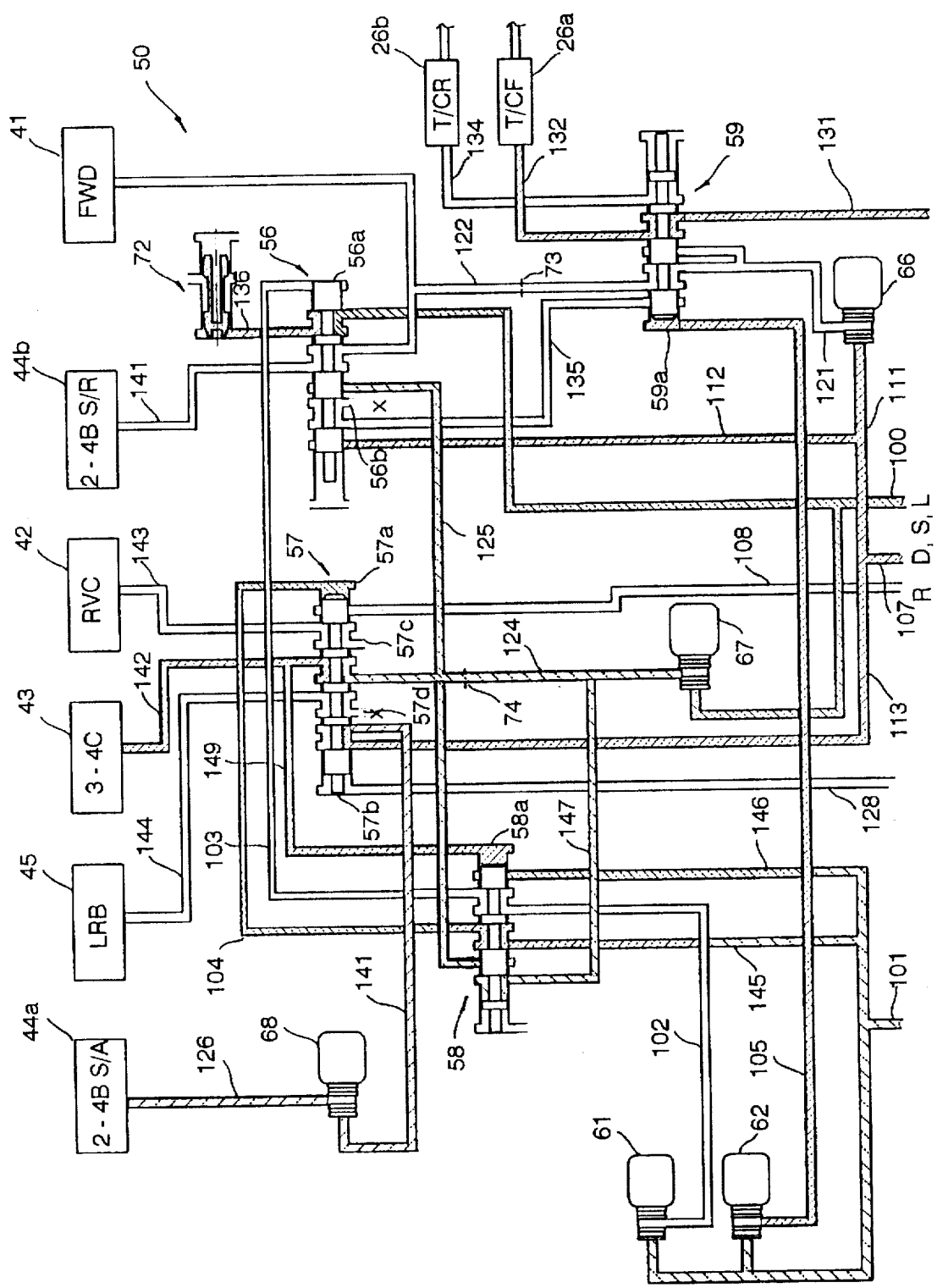
FIG. 8 is an enlarged view of an essential part of the hydraulic pressure control circuit of FIG. 3 which provides a fourth gear.

As shown in Tables II and III and in FIG. 8, while the first duty solenoid valve 66 is ON, through which the downstream forward clutch pressure line 122 is drained, the first solenoid valve 61 is ON, through which the control port 56a of first shift valve 51 is drained. Resultingly, the first shift valve 51 shift the spool to the right end position, so as to bring the forward clutch pressure line 122 into communication with the servo release pressure line 141 through the pressure line 123, thereby discharging simultaneously the forward clutch pressure and servo release pressure through the first duty solenoid valve 66 and pressure line 121 or through the first shift valve 56 and source pressure line 135 according to the operated condition of lock-up control shift valve 59. That is, the forward clutch 41 is unlocked, and the 2–4 brake 44 is locked again.

As shown in Table II, in a transitional pattern (3→4) between the third (3) gear and forth (4) gear, since the third duty solenoid valve 68 duty-controls the operating pressure so as to provide appropriately regulated servo supply pressure, the third (3) to fourth (4) gear shift is caused smoothly without accompanying significant shift shock.

Further, as shown in Table III, during a down-shift from the forth (4) gear to third (3) gear in a power-on mode, the first duty solenoid valve 66 turns OFF, directing the operating pressure from the pressure line 121 to the pressure chamber of forward clutch 41 through the forward clutch pressure line 122 via the lock-up control shift valve 59 and the servo release pressure chamber (S/R) 44b of 2–4 brake 44 through the pressure lines 123 and 141 via the first shift valve 56. Resultingly, the locking of forward clutch 41 and the unlocking of 2–4 brake 44 are simultaneously caused. During this, the third duty solenoid valve 68 duty-controls the servo apply pressure with the effect of performing unlocking smoothly the 2–4 brake.

As shown in FIG. III, during the down-shift from the forth (4) gear to third (3) gear in a power-off mode in which the forward clutch 41 locks, the first solenoid valve 61 turns OFF, forcing the first shift valve to shift the spool to the left end position. The operating pressure having been accumulated in the accumulator in the fourth (4) gear is delivered to the pressure chamber of forward clutch 41. This results in shortening a time necessary to fill the pressure chamber of forward clutch 41 and the forward clutch pressure line 122 with the operating pressure and, as a result, enabling the forward clutch to lock quickly.

Figure 9:
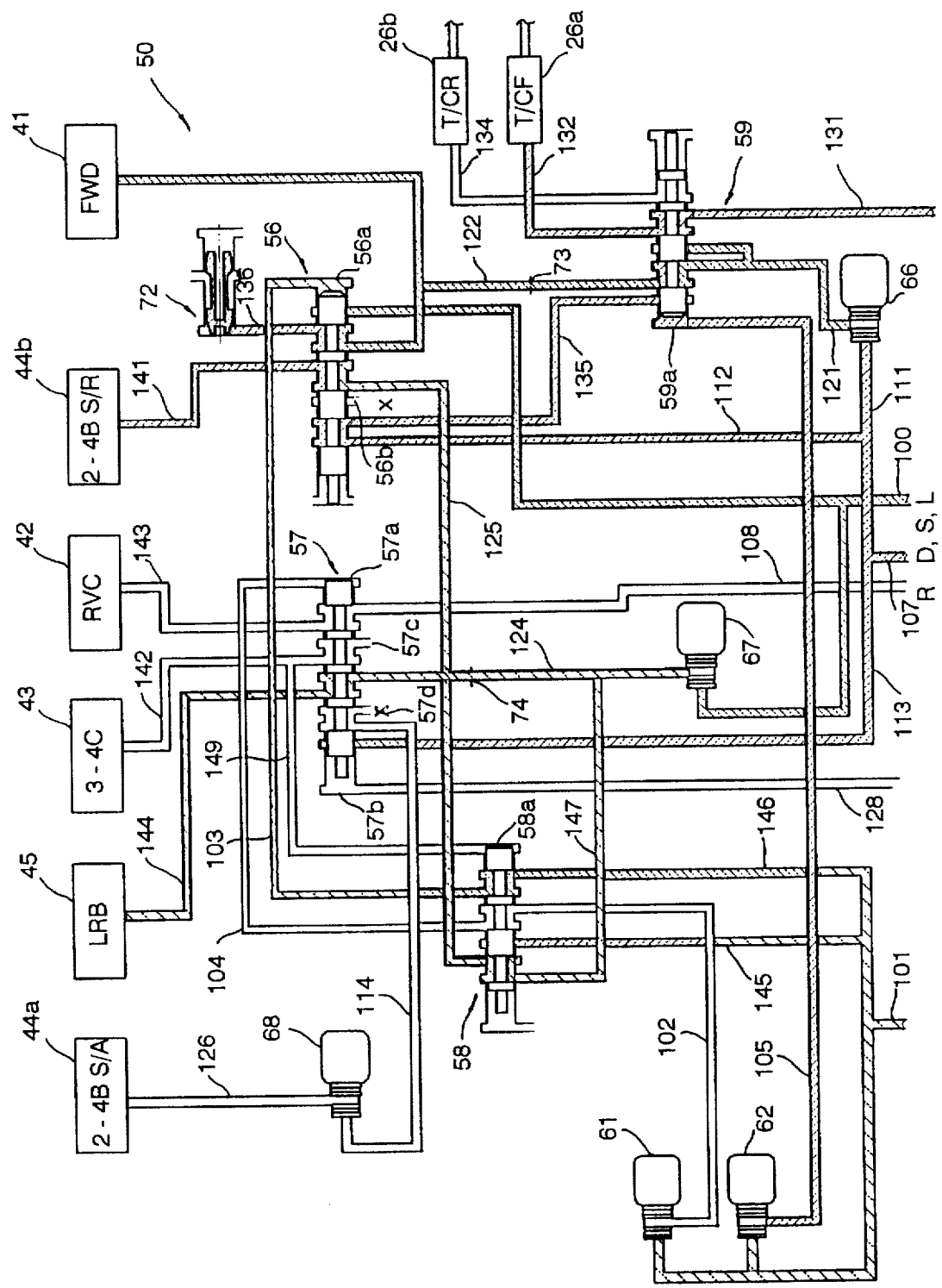
FIG. 9 is an enlarged view of an essential part of the hydraulic pressure control circuit of FIG. 3 which provides a first gear in a low speed (L) range.

As shown in Table IV and in FIG. 9, in the same manner as in the first gear in the drive (D) range, the first solenoid valve 62 delivers the solenoid pressure to the control port 59a of lock-up control shift valve 59, forcing the lock-up shift valve to shift the spool to the right end position. The duty solenoid valve 66 delivers the line pressure supplied through the pressure lines 107 and 111 to the forward clutch (FWD) 41 through the forward clutch pressure line 122 as the forward clutch pressure, locking the forward clutch 41. Simultaneously, the first solenoid valve 61 turns ON with a result of draining the pressure in the downstream pressure line, forcing the second shift valve 57 to shift the spool to the right end position. This causes communication between the pressure lines 104 and 146, so as to direct the fixed level of pressure to the control port 56a of first shift valve 56 with a result of forcing the first shift valve 56 to shift the spool to the left end position. Together, the second duty solenoid valve 67 introduces the line pressure into the pressure lines 124 and 125 from the maine pressure line 100 and then, to the servo release pressure line 141 and low reverse brake pressure line 144. Resultingly, in the first (1) gear in the low speed (L) range, both forward clutch 41 and low reverse brake 45 are simultaneously locked, creating the first (1) gear having the effect of engine brake.

Figure 10:
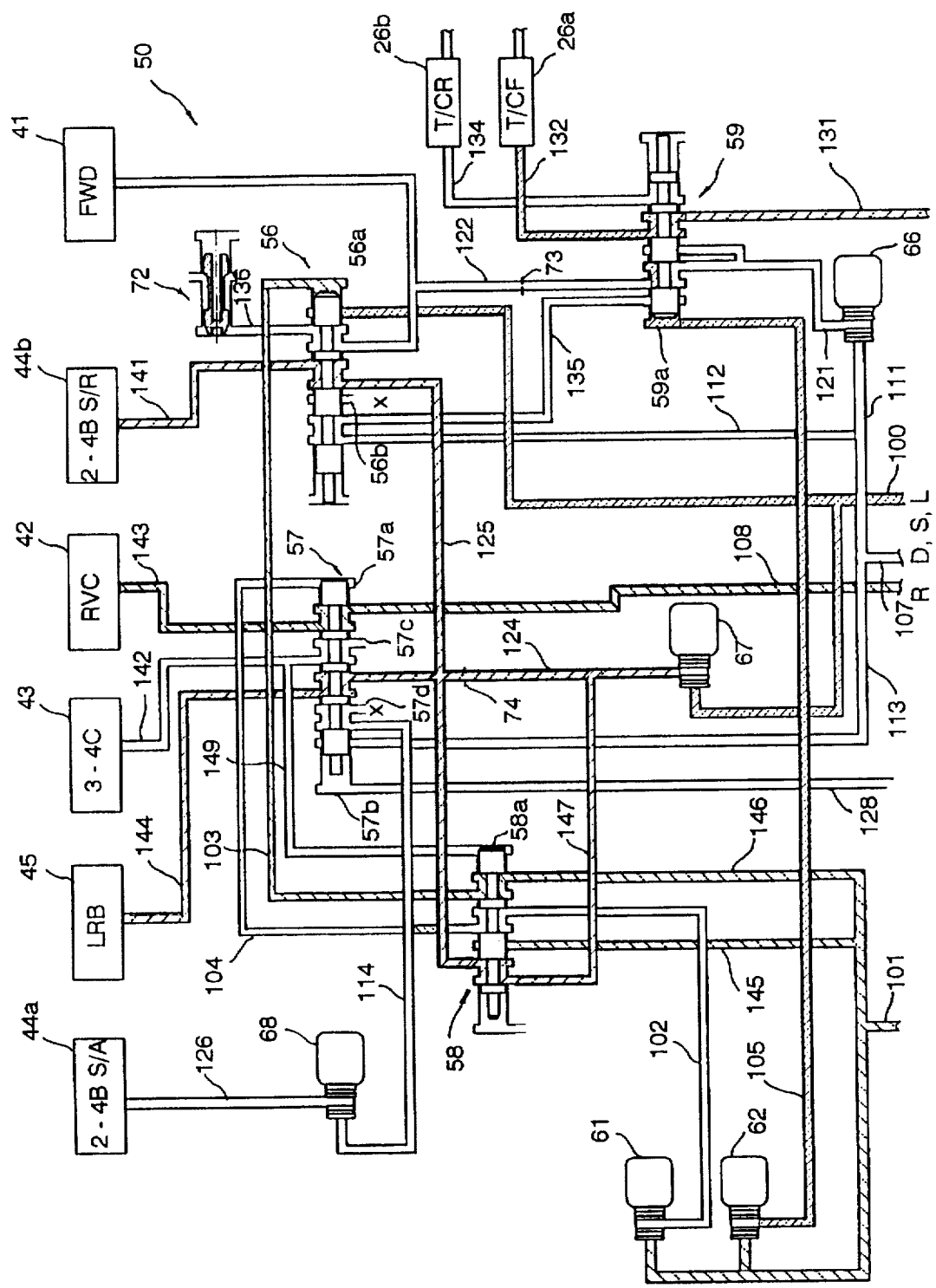
FIG. 10 is an enlarged view of an essential part of the hydraulic pressure control circuit of FIG. 3 which provides a reverse gear.

As shown in Table V and in FIG. 10, in the same manner as in the first (1) gear in the low speed (L) range, the second duty solenoid valve 67 introduces the line pressure into the pressure lines 124 and 125 from the maine pressure line 100 and then, to the low reverse brake pressure line 144 and servo release pressure line 141, by means of which the low reverse brake 45 is locked. Simultaneously, the line pressure is introduced into the reverse pressure line 108 leading from the manual shift valve 52 and then delivered to the reverse clutch pressure line 143 passing through the second shift valve 57. Resultingly, the reverse clutch 42 is supplied with the operating pressure. In this manner, locking is caused on both low reverse brake 45 and reverse clutch 42. In this instance, since the line pressure is not introduced into the forward pressure line 107 in the reverse (R) range, the forward clutch 41 is in no way supplied with operating pressure in spite of the operated condition of the first duty solenoid valve 66.

Figure 11:
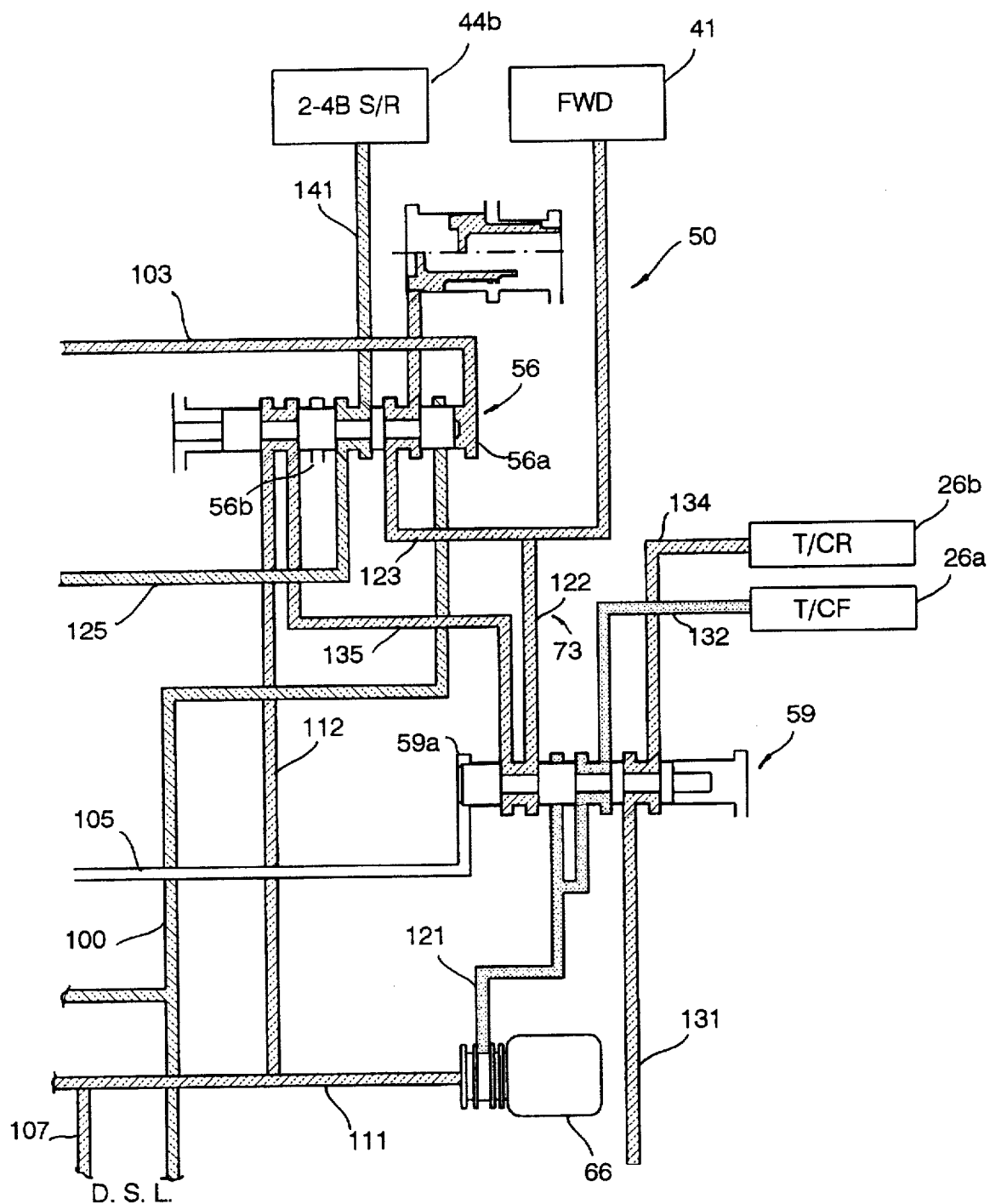
FIG. 11 is an enlarged view of an essential part of the hydraulic pressure control circuit of FIG. 3 which provides lock-up control in the third gear.
Figure 12:
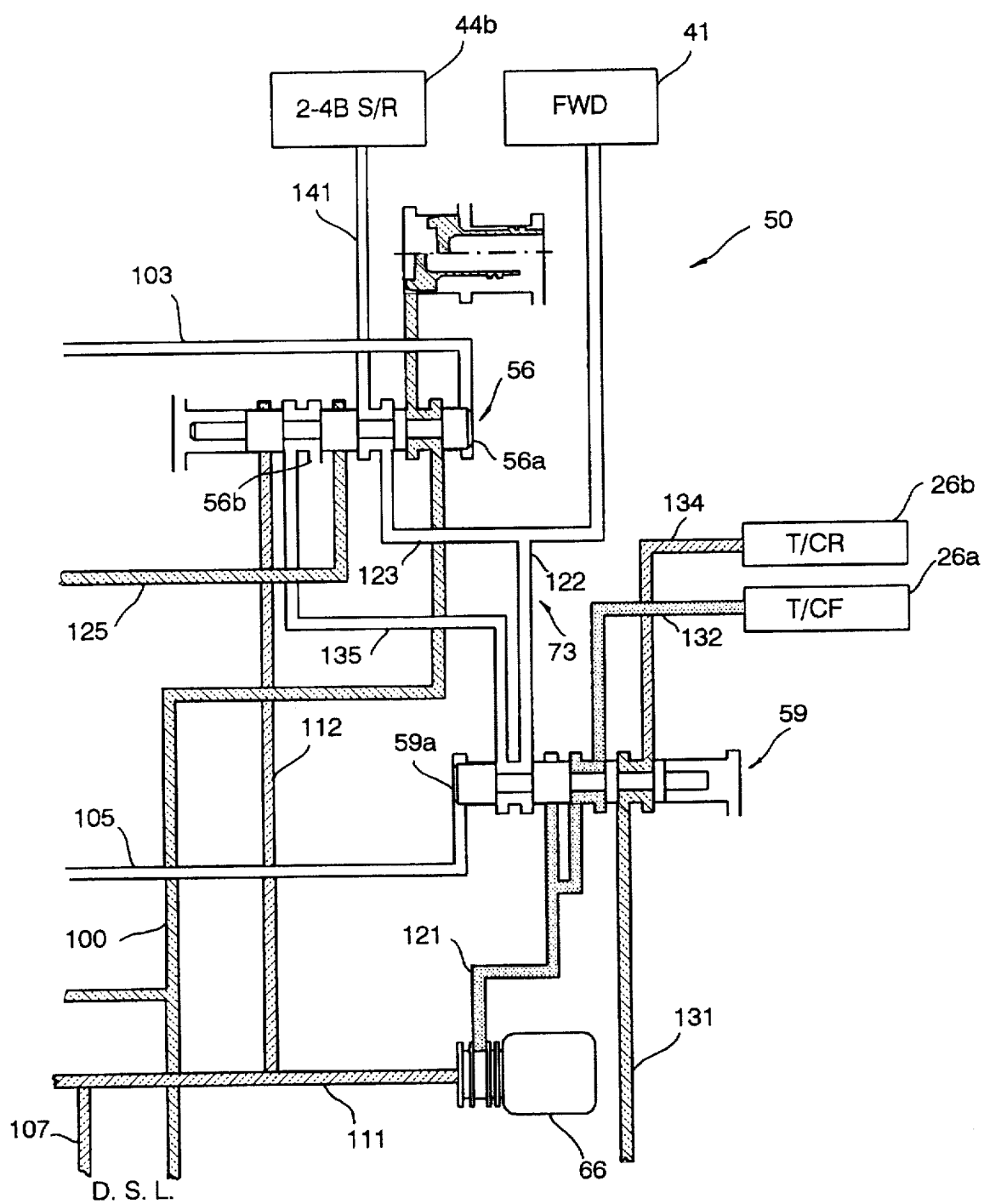
FIG. 12 is an enlarged view of an essential part of the hydraulic pressure control circuit of FIG. 3 which provides lock-up control in the fourth gear.

As shown in Table VI and in FIGS. 11 and 12, when the lock-up control takes place in the third (3) gear, the second solenoid valve 62 turns ON with a result of draining the lock-up control shift valve 59 at the control port 59a, forcing the lock-up control shift valve 59 to shift the spool to the left end position. Communication is provided between the forward clutch pressure line 121 and source pressure line 135, between the pressure line 121 downstream from the first duty solenoid valve 66 and front pressure chamber (T/CF) 26a of lock-up clutch 26, and between the converter pressure line 131 and rear pressure chamber (T/CR) 26b of lock-up clutch 26, respectively. Simultaneously, the first duty solenoid valve 66 is drained at the downstream side. Resultingly, the lock-up clutch 26 is suppiied at the rear pressure chamber (T/CR) 26b with the converter pressure and is drained from the front pressure chamber (T/CF) 26a, becoming locked. During the lock-up control, the line pressure is introduced into the forward clutch pressure line 122 from the forward pressure line 107 through pressure lines 112 and 135 via the first shift valve 56, holding the forward clutch 41 locked.

With the hydraulic pressure control circuit 50 equipped with the source pressure supply line 135, even while the first duty solenoid valve 66 executes the lock-up control, the forward clutch 41 is supplied with locking pressure through the forward clutch pressure line 122 from the source pressure supply line 135.

During the control of transitional operation of the lock-up clutch 26 between locked and unlocked conditions (3–3L/U) and during the control of slippage of the lock-up clutch 26, the first duty solenoid valve 66 duty-controls of the locking pressure to the front pressure chamber 26a of lock-up clutch 26, performing the lock-up control and slippage control.

When the lock-up control is made in the fourth (4) gear, in the same manner as in the third (3) gear, the second solenoid valve 62 turns ON, draining the lock-up control shift valve 59 at the control port 59a. Resultingly, as shown in FIG. 12, the lock-up shift valve 59 shifts the spool to the left end position, providing communication between the forward clutch pressure line 122 and source pressure supply line 135, between the pressure line 121 downstream from the first duty solenoid valve 66 and front pressure chamber 26a of lock-up clutch 26, and between the converter pressure line 131 and rear pressure chamber 26b of lock-up clutch 26. Simultaneously, the first duty solenoid valve 66 drains the downstream side.

Since the first shift valve 56 holds the spool in the right end position, the source pressure line 135 also holds the communication with the drain port 56b of first shift valve 56. Accordingly, the converter pressure is supplied to the rear pressure chamber 26b of lock-up clutch 26 and locks the lock-up clutch 26. In this instance, the forward clutch pressure 122 is brought into communication with the drain port 56b of first shift valve 56 through the source pressure supply line 135, unlocking the forward clutch 41.

With the hydraulic pressure control circuit 50 thus structured, even while the first duty solenoid valve 66 performs the lock-up control, the forward clutch 41 is unlocked without any difficulty by means of shifting the spool of first shift valve 56. In this instance, during the control of transitional operation of the lock-up clutch 26 between locked and unlocked conditions (4⇌4L/U) and during the control of slippage of the lock-up clutch 26, the first duty solenoid valve 66 duty-controls of the locking pressure to the front pressure chamber 26a of lock-up clutch 26, performing the lock-up control and slippage control.

In the hydraulic pressure control circuit 50, if the lock-up clutch 26 is in the locked condition before the third (3) gear to fourth (4) gear shift, in order for the first duty solenoid valve 66 to hold the communication with the front pressure chamber 26a of lock-up clutch 26, the drain port 56a of first shift valve 56 is brought into communication with the source pressure supply line 135 so as to drain the pressure chamber of forward clutch (FWD) 41. On the other hand, if the lock-up clutch 26 is in the unlocked condition before the third (3) gear to fourth (4) gear shift, in order to reduce shift shock, the first duty solenoid valve 66 adjusts a timing of draining the pressure chamber of forward clutch (FWD) 41.

For the purpose of certainly reducing shift shock during the fourth (4) to third (3) gear shift, while the lock-up control is prohibited during the fourth (4) to third (3) gear shift, the first duty solenoid valve 66 controls the operating pressure with a high degree of accuracy.

As described above, the utilization of the lock-up control valve 59 enables the hydraulic pressure control circuit 50 to use the first duty solenoid valve 66 to control the lock-up clutch 26, as well as to principally control the operating pressure for the forward clutch 41. The source pressure line 135 allows supply of the source control pressure to the forward clutch 41 even during the control of lock-up clutch 26 by the first duty solenoid valve 66. The first shift valve 56, which is drained during a shift to the fourth (4) gear, eliminates difficulty in the shift to the fourth (4) gear.

Specifically, the hydraulic pressure control circuit 50 in which only one pressure control means, i.e. the first duty solenoid valve 66, is used to control locking and unlocking of both forward clutch 41 and lock-up clutch 26 performs supply of source pressure to the forward clutch without difficulty even in an automatic transmission not having a one-way clutch which cooperates with the forward gear and but runs idle in a specific high speed gear. Together, the utilization of the first duty solenoid valve 66, which is principally used to control the operating pressure for the forward clutch 41 unlocked in the forth gear and locked in gears other than the forth gear, enables lock-up control to be done in each forward gear. This results in realizing structurally simplified and low cost automatic transmissions control system.

The automatic transmissions control system 50 described above provides precise control of operating pressure for the forward clutch 41 and timings at which the operating pressure is supplied and discharged during a gear shift, which results in precise and efficient control of the lock-up clutch and improves the performance of the automatic transmission including improved fuel efficiency due to an increase in power transmission efficiency and satisfied feelings of gear shifts.

Furthermore, in the case where lock-up control takes place prior to a gear shift to the fourth gear, the automatic transmissions control system allows the gear shift to the fourth gear without difficulty even during the lock-up control. This results from the fact that the first shift valve 56 discharges the pressure from the source pressure line 135 for providing the fourth gear if the lock-up clutch 26 is controlled prior to the gear shift. If the lock-up clutch 26 is not controlled prior to the gear shift, the first duty solenoid valve 66 provides the fourth gear while discharging the operating pressure from the forward clutch 41. This enables to perform a minute pressure discharge timing, yield a decrease in shift shocks and satisfied feelings of gear shifts.

Leaving the lock-up clutch 26A uncontrolled during a gear shift from the fourth (4) gear to the third (3) allows the first duty solenoid valve 66 to control the operating pressure for the forward clutch 41 with a result of a decrease in shift shocks and satisfied feelings of gear shifts.

Direct connection between the first duty solenoid valve 66 and accumulator 72 allows the first duty solenoid valve 66 to bear the function of governing accumulation and discharge of pressure of the accumulator 72 as well as the function of draining the source pressure line 135.

In the case where the four forward speed automatic transmission has a forward clutch, a 2–4 brake and a 3–4 clutch as friction coupling elements, the first shift valve 56 is operative in two positions, i.e. the first operative position where pressure communication is provided between the brake release pressure chamber 44b of 2-4 brake 24 and 3-4 clutch 43 for providing a second (2) to third (3) gear shift and a third (3) to second (2) gear shift, and the second operative position where pressure communication is provided between the brake release pressure chamber 44b of 2-4 brake 24 and forward clutch 41 for providing a third (3) to fourth (4) gear shift and a fourth (4) to third (3) gear shift. This enables the first duty solenoid valve 56 to have another function in addition to the function of supplying source pressure from the accumulator 72 and the function of draining the pressure line 135, which is contributory to the simplification of automatic transmissions control system.

Figure 13:
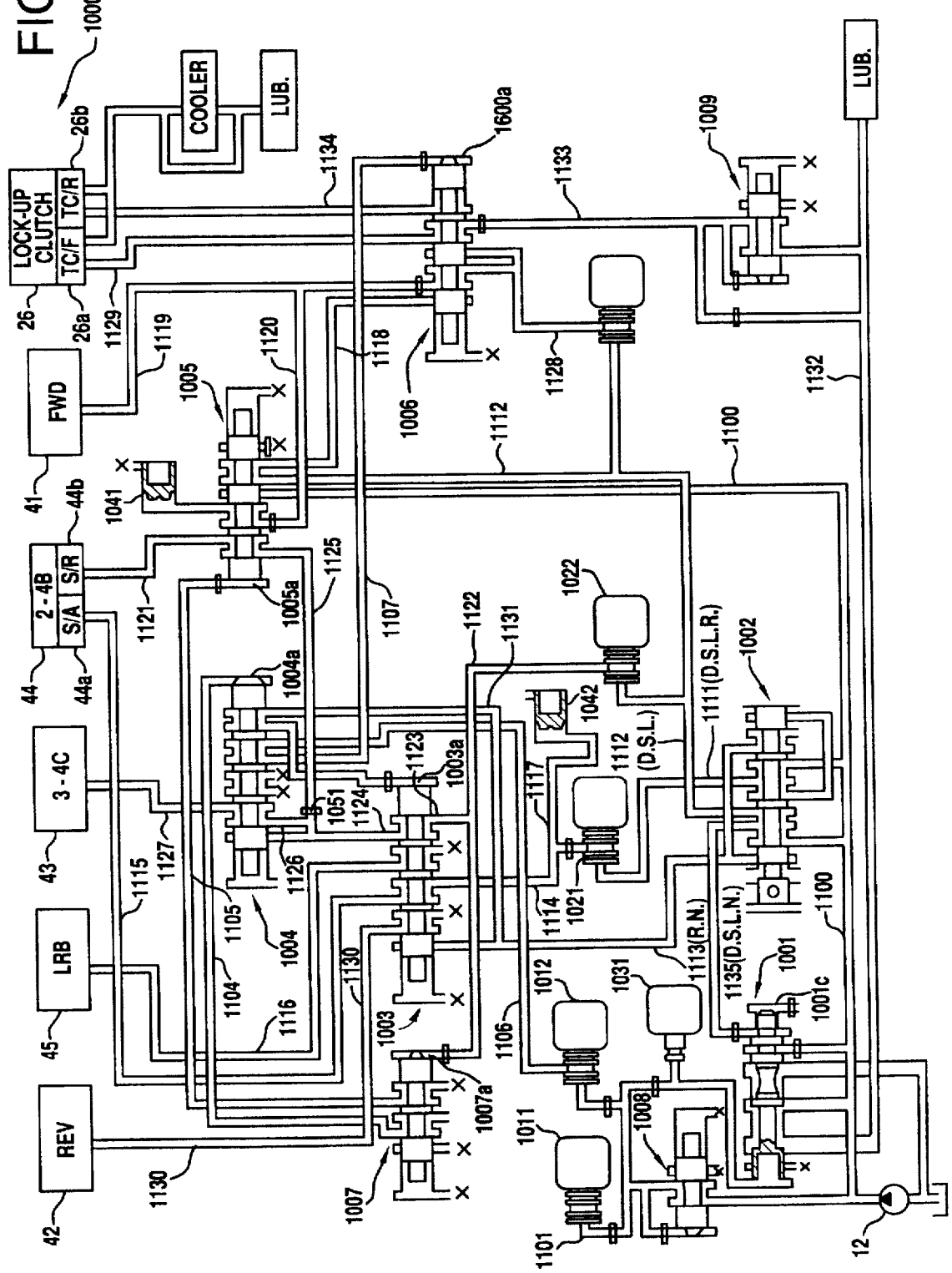
FIG. 13 is a diagrammatic view of a hydraulic pressure control circuit according to another embodiment of the present invention.

FIG. 13 shows a basic structure of a hydraulic pressure control circuit 1000 in accordance with another embodiment of the invention, in which friction coupling elements and various valves per se are the same in structure and operation as those in the previous embodiment. The hydraulic pressure control circuit 1000 includes various valves as essential elements, namely a regulator valve 1001 for generating a line pressure (control source pressure), a manual shift valve 1002 for shifting ranges of the automatic transmission 10 according to manual range selections through a shift lever, first to third duty solenoid valves (DSVs) 1021-1023 for changing pressure lines according to gears, first and second ON-OFF solenoid valves (SVs) (which are hereafter referred to simply as first and second solenoid valves) 1011 and 1012, utilized to supply operating pressure to various shift valves, including a low reverse shift valve 1003, a bypass control valve 1004, a 3-4 shift valve 1005 and a lock-up control valve 1006. The first to third duty solenoid valves 1021-1023 are utilized to generate, regulate and discharge operating pressure to pressure chambers of the friction coupling elements 41-45. The hydraulic pressure control circuit 1000 further includes a solenoid relay valve (which is hereafter referred to simply as a relay valve) 1007 for selectively supplying operating pressure introduced from the first solenoid valve 1011. Those solenoid valves 1011, 1012 and 1021-1023 are of a three-way type having operating modes, namely a communication mode where hydraulic pressure is allowed to flow in a pressure line from the upstream side to the downstream side and vice versa, and a drain mode where hydraulic pressure is drawn from the downstream pressure line. In the drain mode, since the valve shuts off its related upstream pressure line during draining its related downstream pressure line, there is no aimless drainage of hydraulic pressure from the upstream pressure line, decreasing driving loss of the oil pump 12. Each of the solenoid valves 1011 and 1012 opens the upstream and downstream pressure lines when it turns ON. Each of the duty solenoid valves 1021-1023 provides its full opening so as to allow the whole part of pressure to run therethrough when it turns OFF or operates at a duty rate of 0%.. On the other hand, when each duty solenoid valve 1021-1023 turns ON, it shuts off its elated upstream pressure line so as to drain the downstream pressure line during operating at a duty rate of 100% and regulates operating pressure from the upstream pressure line according to duty rates at which it operates and delivers it to the downstream pressure line.

The regulator valve 1001 regulates operating pressure discharged by the oil pump 12 to a fixed level of line pressure which in turn is delivered to the manual shift valve 1002 through a main pressure line 100 and also to a solenoid reducing valve (which is hereafter referred to simply as a reducing valve) 1008 and the 3-4 shift valve 1005. The line pressure is reduced by the reducing valve 1008 to a fixed pressure level and then, delivered to the first and second solenoid valves 1011 and 1012 through pressure lines 1101 and 1102, respectively. When the first solenoid valve 1011 is ON, the fixed level of line pressure is delivered to the relay valve 1007 through a pressure line 1103 and, when the relay valve holds its spool in the right end position as viewed in FIG. 13, further directed to the control port 1004a of bypass control valve 1004 as pilot pressure through a pressure line 1104. As a result, the bypass control valve 1004 shifts its spool to the left end position as viewed in FIG. 13. On the other hand, when the relay valve 1007 holds the spool in the left end position, the fixed level of line pressure is delivered to the control port 1005a of 3-4 shift valve 1005 as a pilot pressure through a pressure line 1105 and forces the 3-4 shift valve 1005 to shift the spool to the right end position.

When the second solenoid valve 1012 is ON, the fixed level of line pressure from the reducing valve 1008 is delivered to the bypass control valve 1004 through a pressure line 1006 and, when the bypass control valve 1004 holds its spool in the right end position, further directed to the control port 1006a of lock-up control valve 1006 as pilot pressure through a pressure line 1107. This causes the lock-up control valve 1006 to shift the spool to the left end position. On the other hand, when the bypass control valve 1004 holds the spool in the left end position, the fixed level of line pressure is delivered to the control port 1003a of low-reverse shift valve 1003 as a pilot pressure through a pressure line 1105 and forces the valve 1003 to shift the spool to the left end position.

Further, the fixed level of line pressure from the reducing valve 1008 is also delivered to a regulation port 1001a of regulator valve 1001 through a pressure line 1109. In this instance, the line pressure is regulated according to, for instance, engine load by means of a linear solenoid valve 1031 installed in the pressure line 1109. In this way, the line pressure is regulated according to engine load by means of the regulator valve 1001. A main pressure line 1100 leading to the 3-4 shift valve 1005 is held in communication with a first accumulator 1041 through pressure line 1110 when the 3-4 shift valve holds its spool in the right end position, so as to introduce line pressure into the first accumulator 1041.

The line pressure delivered to the manual shift valve 1002 through the main pressure line 1100 is introduced into a first output pressure line 1111 and a second output pressure line 1112 in each of forward ranges, i.e. the drive (D) range, slow speed (S) range and low speed (L) range, into the first output pressure line 1111 and a third output pressure line 1113 in the reverse (R) range, and into the third output pressure line 1113 in the neutral (R) range. The first output pressure line 1111 leads to the first duty solenoid valve 1021 and delivers the line pressure to the same as control source pressure. The second output pressure line 1112 leads to both second duty solenoid valve 1022 and third duty solenoid valve 1023 so as to supply the line pressure to them as control source pressure. The first duty solenoid valve 1021 leads at its downstream to the low-reverse shift valve 1003 through a pressure line 1114 and, when the low-reverse shift valve 1003 holds the spool in the right end position, further holds itself in communication with the servo apply pressure chamber 44a of 2-4 brake 44 through a servo apply pressure line 1115 and on the other hand, when the low-reverse shift valve 1003 holds the spool in the left end position, further holds itself in communication with the pressure chamber 44a of low-reverse brake 45 through a low-reverse pressure line 1116. A pressure line 1117 branches off from the pressure line 1114 and leads to a second accumulator 1042.

The first output pressure line 1112 further leads to the 3-4 shift valve 1005 and, when the 3-4 shift valve 1005 holds the spool in the left end position, keeps communication with the lock-up control valve 1006 through a pressure line 1118. When the lock-up control valve 1006 shifts its spool to the left end position, it brings the first output pressure line 1112 into communication with the pressure chamber of forward clutch (FWD) 41 through a pressure line 1119.

A pressure line 1120, which branches off from the forward clutch pressure line 1119, leads to the 3-4 shift valve 1005. The 3-4 shift valve 1005 provides communication of the pressure line 1120 with the first accumulator 1041 through the pressure line 1110, when holding its spool in the left end position and, when holding its spool in the right end position, communication of the pressure line 1120 with the servo release pressure chamber 44b of 2-4 brake 44.

The duty solenoid valve 1022 leads at its downstream side to the control port 1007a of relay valve 1007 through a pressure line 1122 and supplies pilot pressure with which the relay valve 1007 is forced to shift its spool to the left end position. A pressure line 1123 branching off from the pressure line 1122 leads to the low-reverse shift valve 1003. The low-reverse shift valve 1003 provides, when holding the spool in the right end position, communication of the pressure line 1123 with a pressure line 1124. Branching off from the pressure line 1124 through an orifice 1051 is a pressure line 1125 which in turn leads to the 3-4 shift valve 1005. The 3-4 shift valve 1005 provides, when holding the spool in the left end position, communication of the pressure line 1125 with the servo release pressure chamber 44b of 2-4 brake 44 through the pressure line 1121. Further, a pressure line 1126 branches off from the pressure line 1125 and leads to the bypass control valve 1004. The bypass control valve 1004 provides, when holding the spool in the right end position, communication of the pressure line 1126 with the 3-4 clutch 43 through a pressure line 1127.

The pressure line 1124 leads directly to the bypass control valve 1004 which in turn provides communication of the pressure line 1124 with the pressure line 1125 through the pressure line 1126 when holding the spool in the left end position. That is, the pressure lines 1124 and 1125 form a bypass pressure line in connection with the orifice 1051.

The third duty solenoid valve 1023 leads at the downstream side to the lock-up control valve 1006 through the pressure line 1128. The lock-up control valve 1006 provides communication of the third duty solenoid valve 1023 with the forward clutch pressure line 1119 when holding the spool in the right end position and with the front pressure chamber 26a of lock-up clutch 26 through a pressure line 1129 when holding the spool in the left end position. Similarly, the pressure line 1131 branching off from the third output pressure line 1113 leads to the bypass control valve 1004. The bypass control valve 1004 delivers the line pressure to the control port of low-reverse shift valve 1003 as pilot pressure through the pressure line 1108 during holding the spool in the right end position, forcing the low-reverse shift valve 1003 to shift the spool to the left end position.

The hydraulic pressure control circuit 1000 is further provided with a converter relief valve 1009 which regulates the operating pressure introduced from the regulator valve 1001 through a pressure line 1132 to a fixed level and supplies it to the lock-up control valve 1006 through a pressure line 1133. The fixed level of operating pressure is delivered to the front pressure chamber 26a of lock-up clutch 26 through the pressure line 1129 when the lock-up control valve 1006 shifts the spool to the right end position and, on the other hand, to the rear pressure chamber 26b of lock-up clutch 26 through the pressure line 1134 when the lock-up control valve 1006 shifts the spool to the left end position. In this instance, the lock-up clutch 26 is released or unlocked resulting from filling the front pressure chamber 26a with the fixed level of operating pressure and locked resulting from filling the rear pressure chamber 26b with the fixed level of operating pressure. When the lock-up control valve 1006 holds the spool in the left end position during locking the lock-up clutch 26, the lock-up clutch 26 can locks with locking force according to the level of the operating pressure generated by the third duty solenoid valve 1023 which the lock-up clutch 26 receives in the front pressure chamber 26a.

Figure 14:
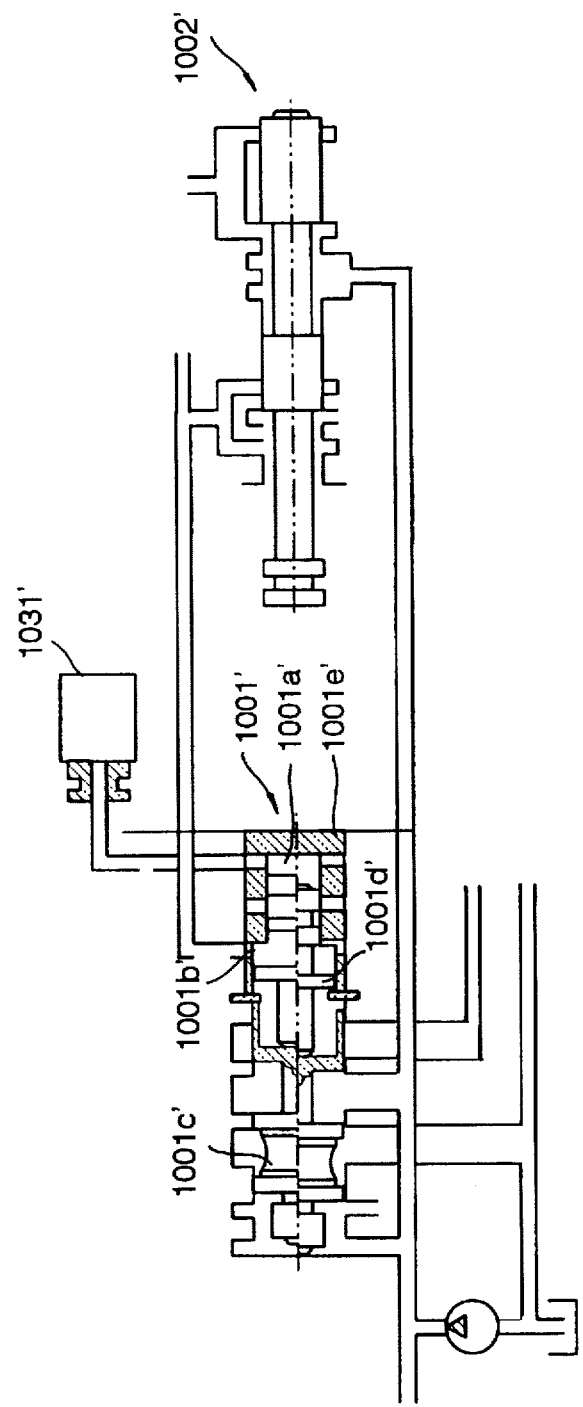
FIG. 14 is a circuit diagram of a regulator valve of the hydraulic pressure control circuit of FIG. 13.

As was previously described, in the hydraulic pressure control circuit 1000, the regulator valve 1001 regulates the line pressure with the control pressure supplied by the linear solenoid valve 1031 to a level according, for instance, to a throttle opening or position. This regulation of line pressure is made differently amongst different ranges. Specifically, the line pressure is regulated to a level higher in the reverse (R) range than in the forward respective (D, S and L) ranges and neutral (N) range. For this purpose, as shown byway of example in FIG. 14, a regulator valve 1001' is typically provided with an extra intensifying port 1001b' to which line pressure is introduced from a manual shift valve 1002' in the reverse range only as well as a regulation port 1001a' to which pilot pressure is introduced from a linear solenoid valve 1031'. Such an extra port 1001b' needs installation of an auxiliary spool and its guide sleeve to the regulator valve 1001' in addition to a primary spool 1001c', which always undesirable in the light of the number of parts and overall size of the valve.

In contradistinction to that, as shown in FIG. 13, the regulator valve 1001 utilized in the hydraulic pressure control circuit 1000 has, on one end of its spool, a regulation port 1001a to which pilot pressure is introduced from the linear solenoid valve 1031 and, on another end of the spool, a reduction port 1001b to which line pressure is introduced from the manual shift valve 1002 through the pressure line 1135 in each of the drive (D), slow speed (S), low speed (L) and neutral (N) ranges. This structure is intended to regulate line pressure not to a level higher in the reverse (R) range but to a level lower in the drive (D), slow speed (S), low speed (L) and neutral (N) ranges, with a result of divided arrangement of the control ports 1001a and 1001b on opposite sides of the spool 1001c which eliminates the necessity of an auxiliary spool and its associated parts.

Figure 15:
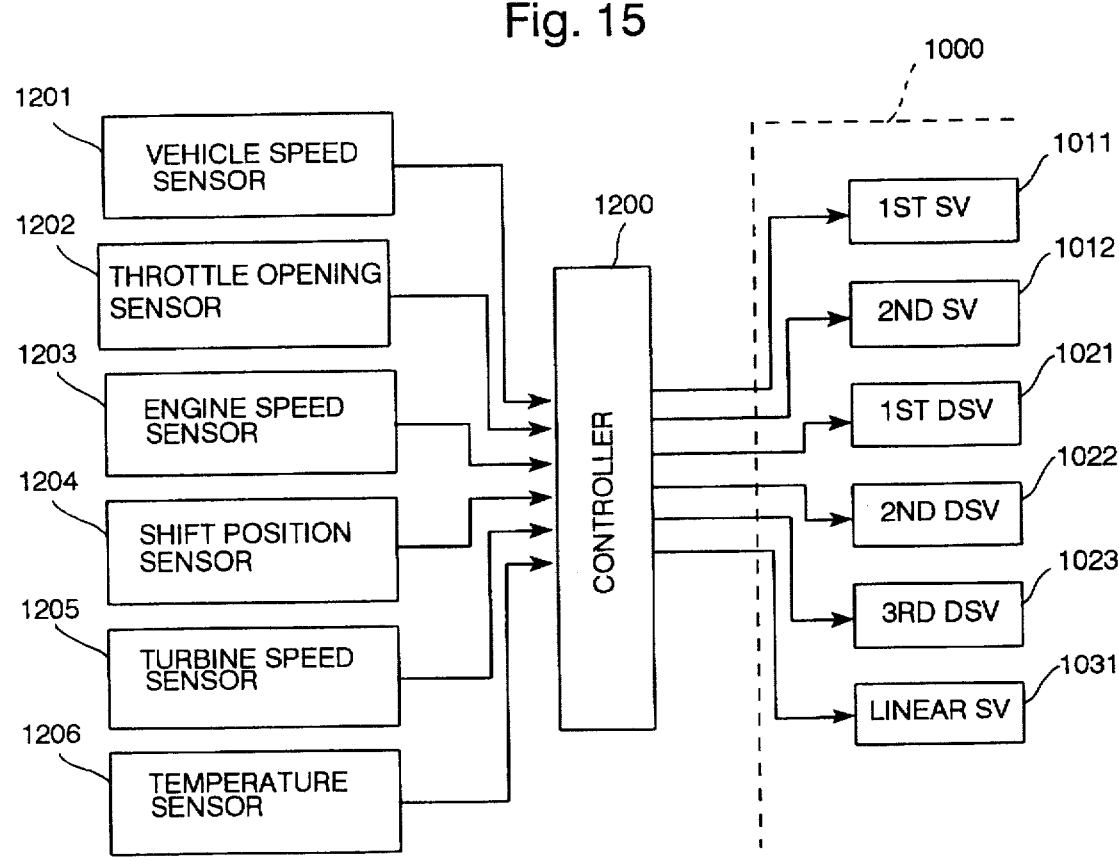
FIG. 15 is a block diagram illustrating a control system for various solenoid valves of the hydraulic pressure control circuit of FIG. 13.

FIG. 15 shows a controller 1200 for controlling operations of the valves 1011, 1012, 1021-1023 and 1031. The controller 1200 receives various control signals, such as a signal representative of a vehicle speed from a speed sensor 1201, a signal representative of engine throttle position or opening as an engine load from a throttle opening sensor 1202, a signal representative of an engine speed in revolution from a speed sensor 1203, a signal representative of a shift position or range selected by a shift lever from a position sensor 1204, a signal representative of a turbine speed in revolution of the torque converter 20 from a speed sensor 1205, and a signal representative of temperature of hydraulic oil in the pressure control circuit 1000 from a temperature sensor 1206, on the basis of which the controller 1200 controls the valves 1011, 1012, 1021-1023 and 1031, according to engine operating conditions and/or vehicle traveling conditions.

The following description will be directed to operation of the solenoid valves 1011, 1012 and duty solenoid valves 1021-1023 in connection with gears and ranges.

The valves 1011, 1012 and 1021-1023 operate in various patterns for the respective gears as shown in the following Table VII. In Table VII, a circle indicates the ON or activated state of each solenoid valve 1011, 1012, and the OFF state or deactivated state of each duty solenoid valve 1021-1023, where pressure lines upstream and downstream from the related valve are held in communication with each other so as to allow operating pressure to pass therethrough; a cross or X label indicates the OFF or deactivated state of each of the solenoid valve 1011, 1012 and the ON or activated state of each of the duty solenoid valve, where an upstream pressure line from the related valve is shut off and a downstream pressure line is drained.

TABLE VII

| Range | D (S) | | | | L | R |
|---|---|---|---|---|---|---|
| Gear | 1 | 2 | 3 | 4 | 1 | Reverse |
| 1st SV (1011) | X | X | X | O | O | O |
| 2nd SV (1012) | X | X | X | X | O | O |
| 1st DSV (1021) | X | O | O | O | O | O |
| 2nd DSV (1022) | X | X | O | O | X | O |
| 3rd DSV (1023) | O | O | O | X | O | O |

Figure 16:
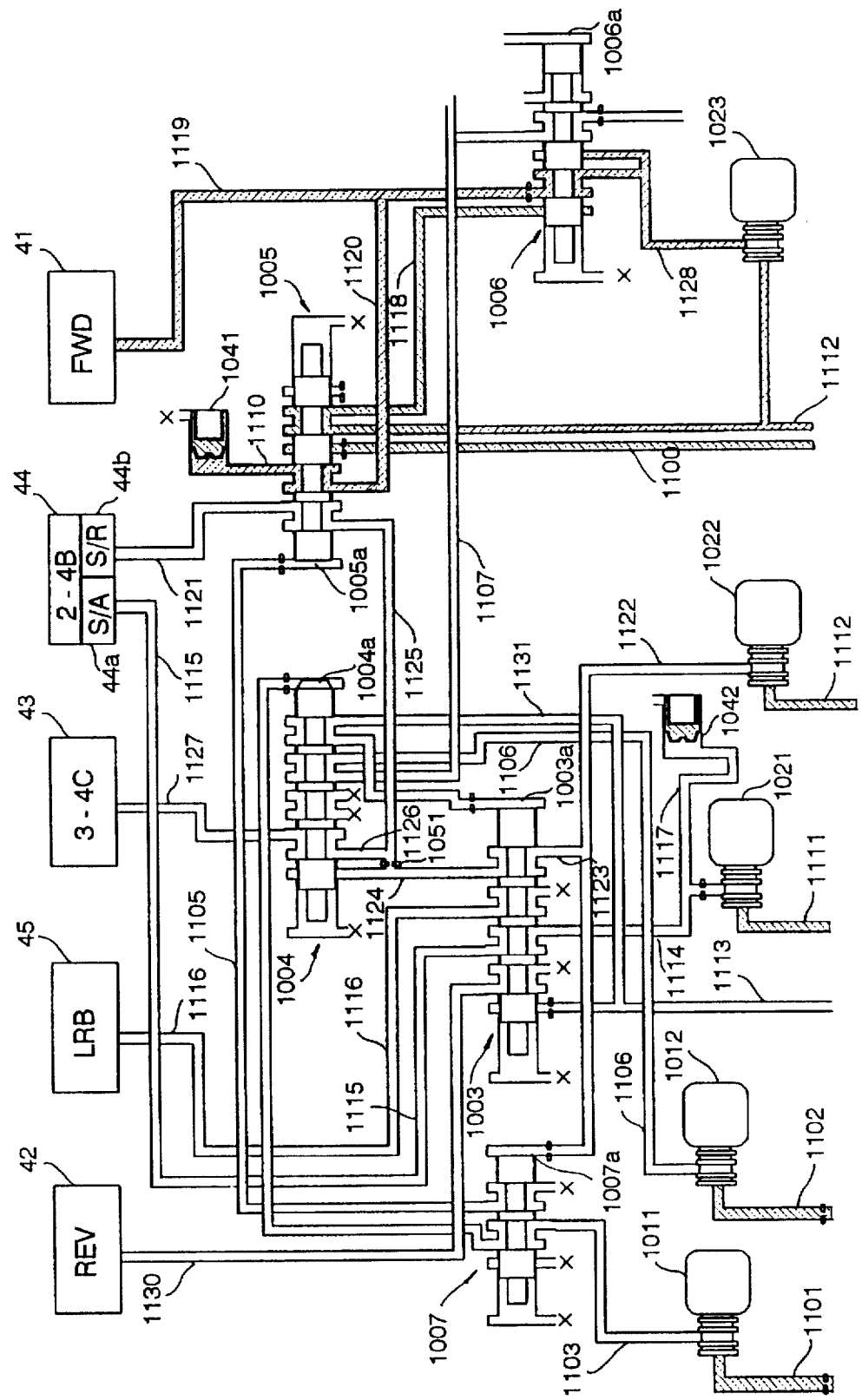
FIG. 16 is an enlarged view of an essential part of the hydraulic pressure control circuit of FIG. 13 which provides a first gear.

As shown in Table VII and in FIG. 16, in the first (1) gear in the forward ranges excepting the low-speed (L) range, only the third duty solenoid valve 1023 is activated or takes its ON state, making the line pressure in the second output pressure line 1112 available and delivering it to the lock-up control valve 1006 through the pressure line 1128 as operating pressure. In this state, the lock-up control valve 1006 holds its spool in the right end position as viewed in FIG. 16, directing the operating pressure to the forward clutch (FWD) 41 through the forward clutch pressure line 1119. Consequently, the forward clutch (FWD) 41 locks. At this time, the first accumulator 1041, in communication with the 3-4 shift valve 1005 to which the pressure line 1120 branching off from the pressure line 1119 and the pressure line 1110 lead, causes the locking pressure to be delivered gradually to the forward clutch (FWD) 41.

Figure 17:
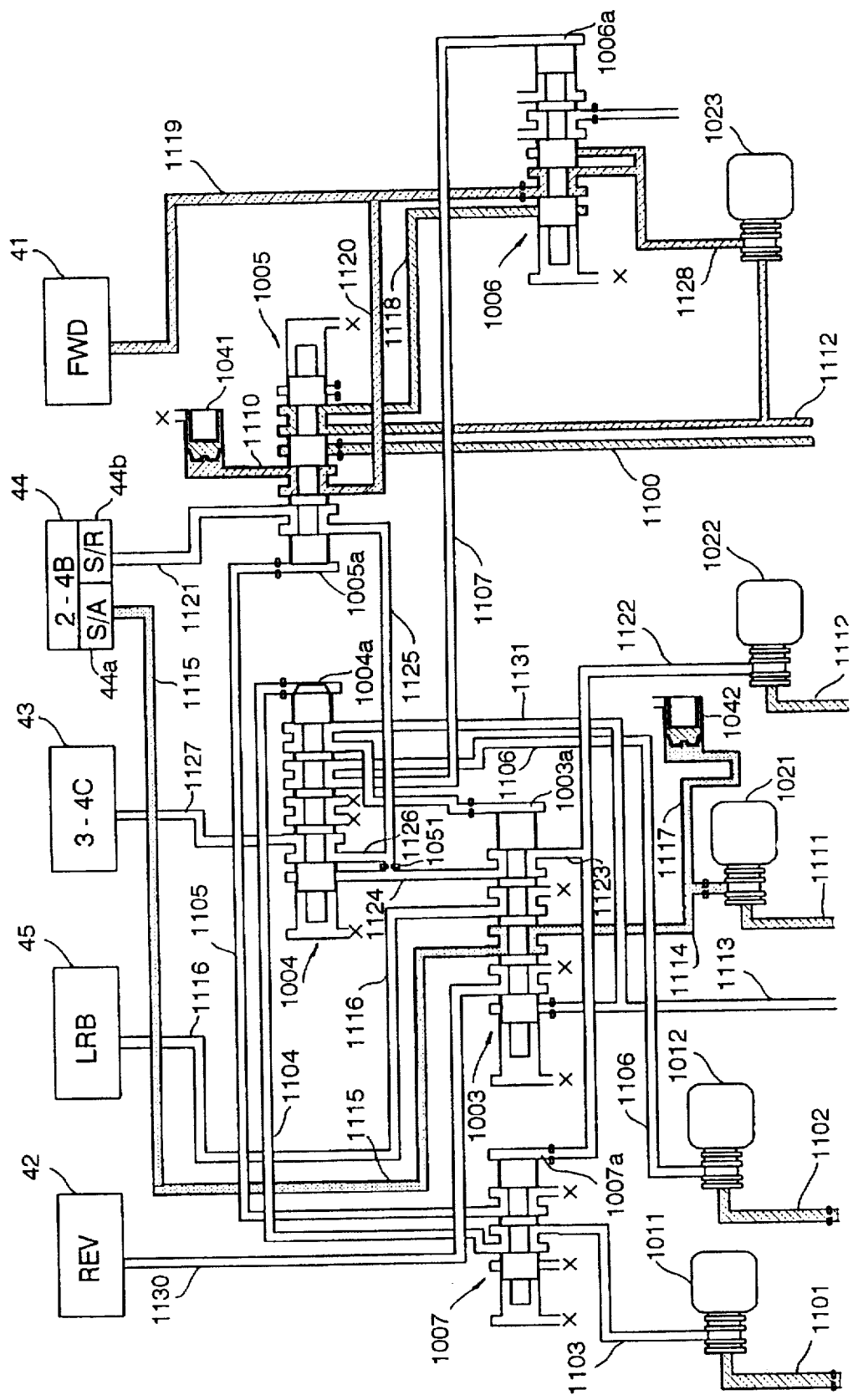
FIG. 17 is an enlarged view of an essential part of the hydraulic pressure control circuit of FIG. 13 which provides a second gear.

As shown in Table VII and in FIG. 17, in the second (2) gear in the forward ranges excepting the low-speed range, the first duty solenoid valve 1021 is activated or takes its ON state as well as the third duty solenoid valve 1023, making the line pressure in the first output pressure line 1111 available and delivering it to the low-reverse shift valve 1003 through the pressure line 1114. At this time, since the row-reverse shift valve 1003 has placed the spool in the right end position as viewed in FIG. 17, it directs the operating pressure as servo applying pressure to the servo apply pressure chamber (S/A) 44a of 2-4 brake (2-4B) 44 through the servo apply pressure line 1115. As a result, the 2-4 brake (2-4B) 44, in addition to the forward clutch (FWD) 41, locks. The second accumulator 1042, which is in communication with the pressure line 1114 through the pressure line 1117, causes locking of 2-4 brake (2-4B) 54 gently. The operating pressure accumulated temporarily in the second accumulator 1042 is delivered to and pre-charged in the low-reverse brake (L/R) 45 when the low-reverse valve 1002 shifts its spool to the left end position upon a gear shift to the first (1) gear in the low-speed (L) range as will be described later.

Figure 18:
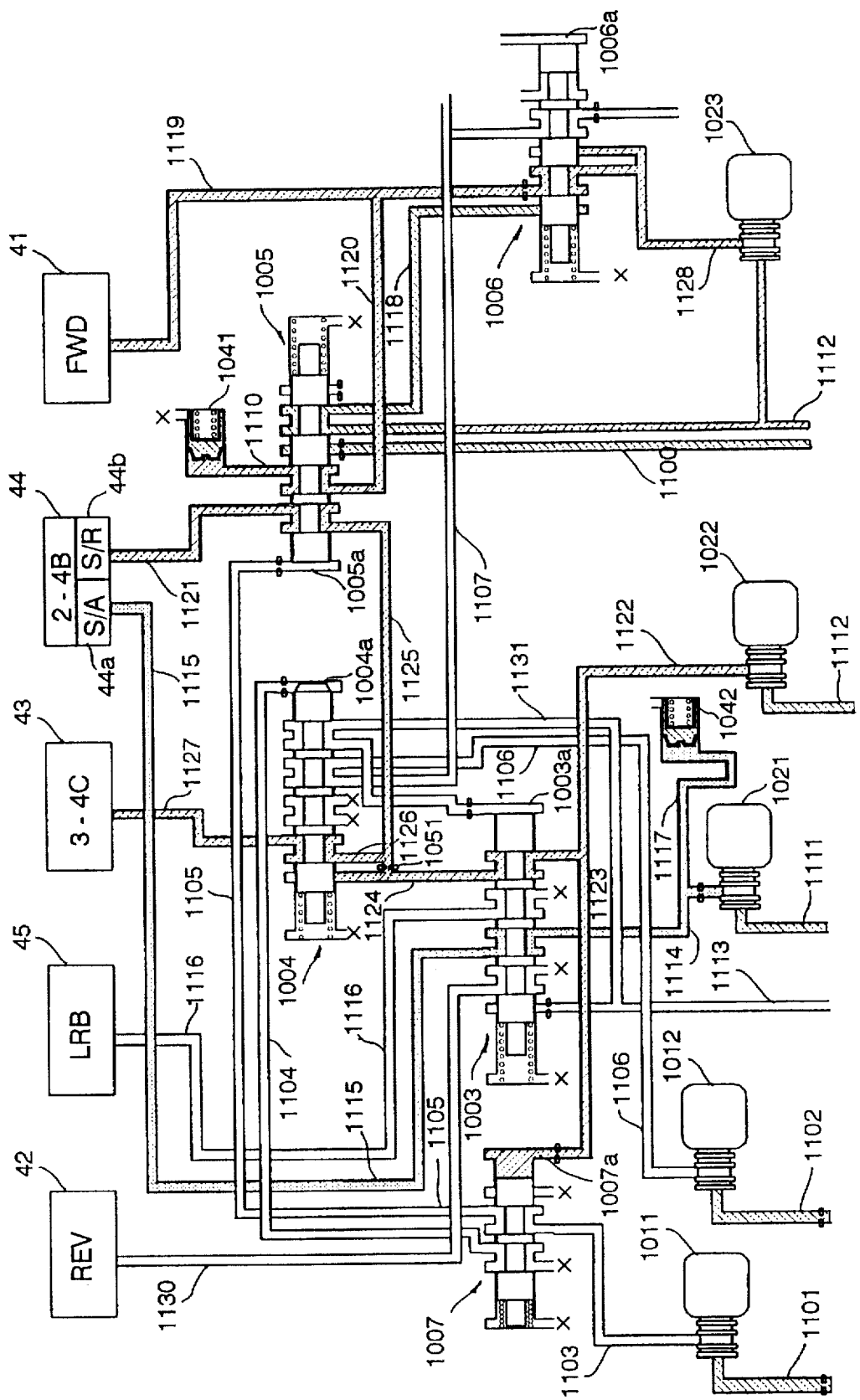
FIG. 18 is an enlarged view of an essential part of the hydraulic pressure control circuit of FIG. 13 which provides a third gear.

As shown in Table VII and in FIG. 18, in the third (3) gear, the second duty solenoid valve 1022 is activated or takes its ON state as well as the first and third duty solenoid valves 1021 and 1023, making the line pressure in the second output pressure line 1112 available and delivering it to the low-reverse shift valve 1003 through the pressure line 1122 via the pressure line 1123. AT this time, the row-reverse shift valve 1003 has placed the spool in the right end position as viewed in FIG. 18, it introduces the line pressure to the pressure line 1124 as operating pressure. On the other hand, the operating pressure from the second duty solenoid valve 1022 is directed to the pressure line 1125 through the pressure lines 1122 and 1124 via the orifice 1051. Since, at this time, the 3-4 shift valve 1005 has placed the spool in the left end position, the operating pressure is supplied as servo release pressure to the servo release pressure chamber 44b of 2-4 brake (2-4B) 44 through the servo release pressure line 1121, releasing or unlocking the 2-4 brake (2-4B) 44. The pressure line 1126, branching off from the pressure line 1125 after the orifice 1051, directs the operating pressure to the bypass control valve 1004 which allows the operating pressure to pass through and reach the 3-4 clutch (3-4C) 43 through the 3-4 clutch pressure line 1127. In such a way, the selection of the 3rd gear causes, on one hand, the forward clutch (FWD) 41 and 3-4 clutch (3-4C) 43 to lock and, on the other hand, the 2-4 brake (2-4B) 44 to lock. In the third (3) gear, the second duty solenoid valve 1022 delivers the operating pressure to the relay valve 1007 at the control port 1007a, forcing the relay valve 1007 to shift the spool to the left end position.

Figure 19:
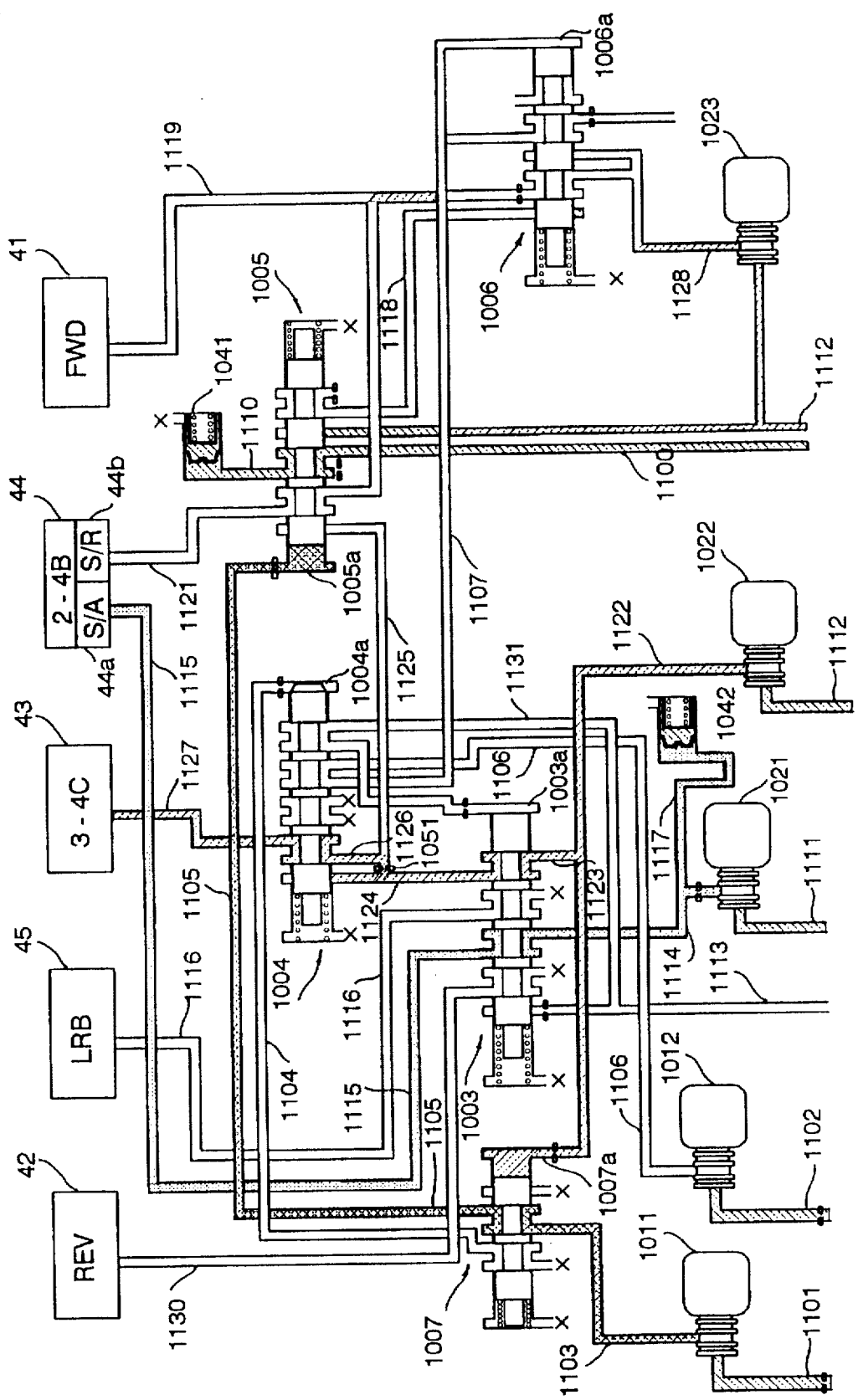
FIG. 19 is an enlarged view of an essential part of the hydraulic pressure control circuit of FIG. 13 which provides a fourth gear.

As shown in Table VII and in FIG. 19, while the first and second duty solenoid valves 1021 and 1022 remain the ON states, the third duty solenoid valve 1023 is deactivated or takes the OFF state, and the first solenoid valve 1011 is activated or takes the ON state. When the first solenoid valve 1011 is activated, the fixed level of operating pressure in the pressure line 1101 is directed to the relay valve 1007 through the pressure line 1103. Since the relay valve 1007 has placed the spool in the left end position upon a gear shift to the third (3) gear, the fixed level of operating pressure passes therethrough and is directed to the control port 1005a of 3-4 shift valve 1005 through the pressure line 1105, forcing it to shift the spool to the right end position. Then, the 3-4 shift valve 1005 brings the pressure line 1120 branching off from the forward clutch pressure line 1119 into communication with the servo release pressure line 1121, providing communication between the pressure chamber of forward clutch (FWD) 41 and the servo release pressure chamber (S/R) 44b of 2-4 brake (2-4B) 44. By means of the deactivation of third duty solenoid valve 1023 which results in shutting down the operating pressure and draining the downstream side pressure line, the forward clutch (FWD) 41 and servo release pressure chamber (S/R) 44b of 2-4 brake (2-4B) 44 are drained through the lock-up control valve 1006 and pressure line 1128. In this way, while the forward clutch (FWD) 41 unlocks, the 2-4 brake (2-4B) 44 is coupled again.

Figure 20:
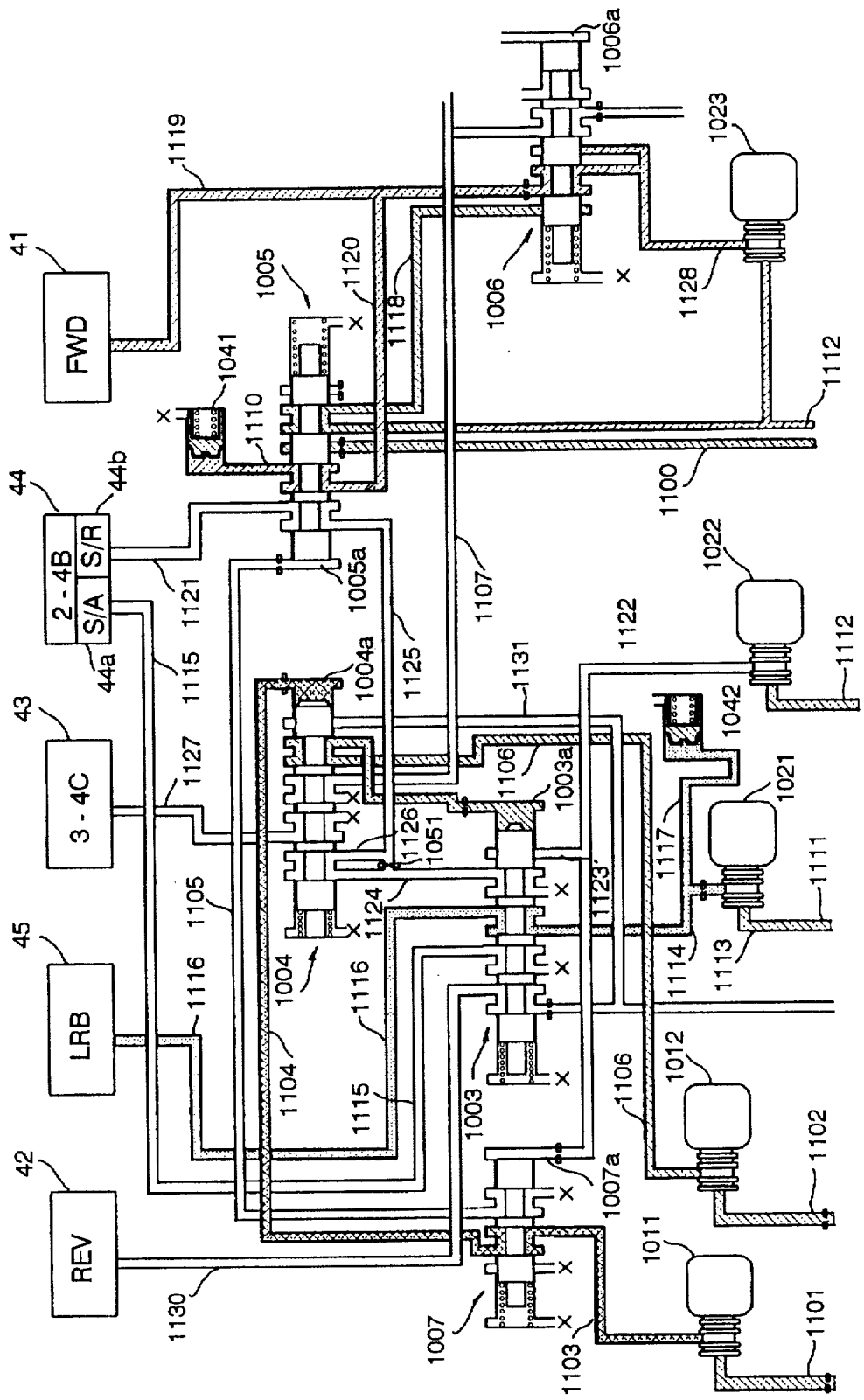
FIG. 20 is an enlarged view of an essential part of the hydraulic pressure control circuit of FIG. 13 which provides a first gear in a low speed (L) range.

As shown in Table VII and FIG. 20, when the first (1) gear is selected in the low speed (L) range, the first and second solenoid valves 1011 and 1012 and first and third duty solenoid valves 1021 and 1023 are activated or take the ON states. The operating pressure regulated by the third duty solenoid valve 1023 is delivered as forward clutch pressure to the forward clutch (FWD) 41 through the pressure lines 1128 and 1119 via the lock-up control valve 1006 in the same way as when selecting the first (1) gear in the drive (D) range, locking the forward clutch (FWD) 41. At this time, the operating pressure is introduced into the first accumulator 1041 through the pressure lines 1110 and 1120 via the 3-4 shift valve 1005, causing the forward clutch (FWD) 41 to lock gently likely in the drive (D) range.

When the first solenoid valve 1011 is activated, the pilot pressure is delivered to the control port 1004a of bypass control valve 1004 through the pressure lines 1103 and 1104 and forces the bypass control valve 1004 to shift the spool to the left end position. The bypass control valve 1004 allows the operating pressure from the second solenoid valve 1012 to pass therethrough and is delivered to the low-reverse valve 1003 through the pressure line 1108, so as to cause the low-reverse valve 1003 to shift the spool to the left end position. Eventually, the operating pressure from the first duty solenoid valve 1021 is delivered as braking pressure to the low-reverse brake (LRB) 45 through the pressure line 1116 via the low-reverse shift valve 1003, locking the low-reverse brake (L/R) 45 as well as the forward clutch (FWD) 41. This provides the first (1) gear with an effect of engine brake.

Figure 21:
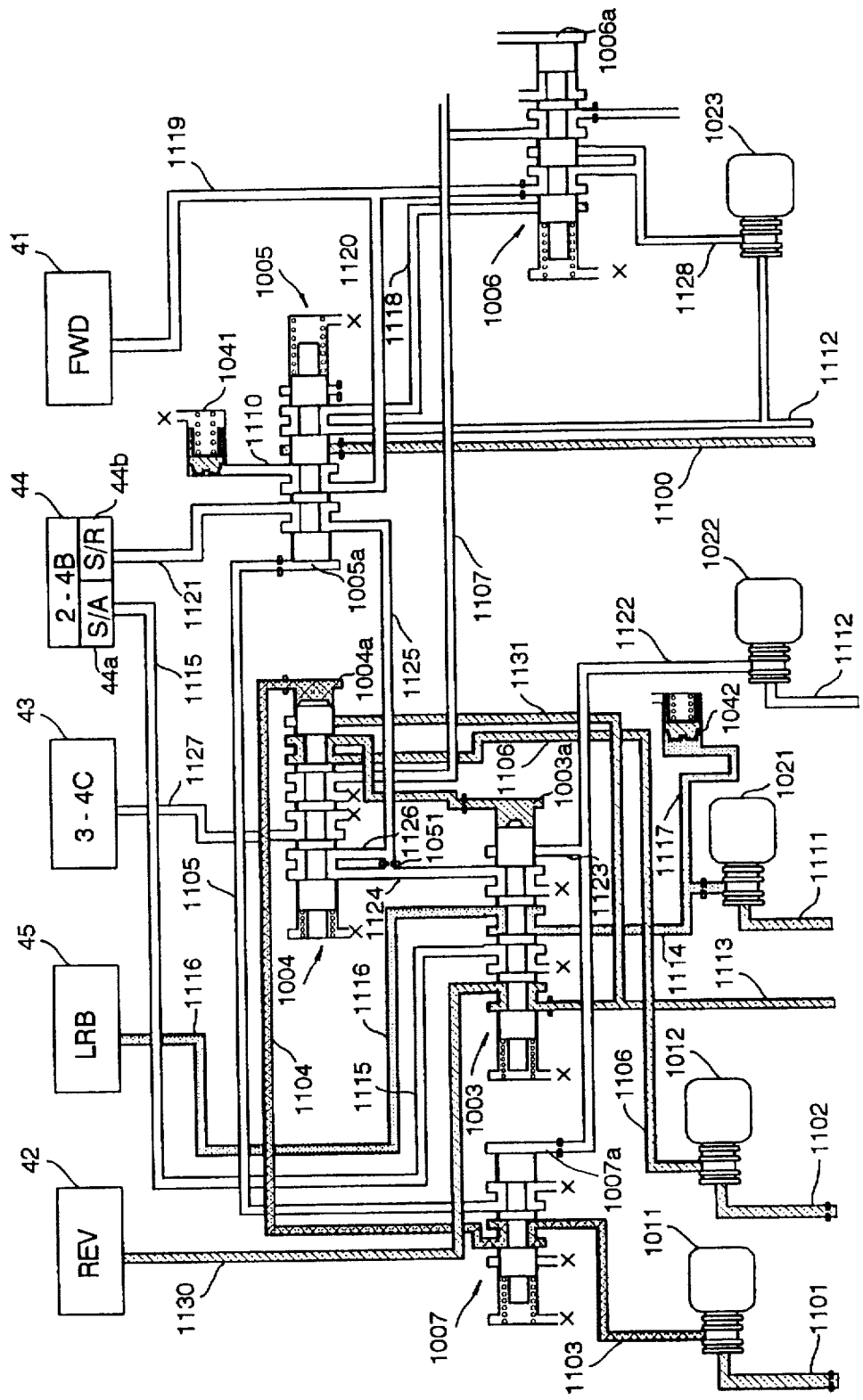
FIG. 21 is an enlarged view of an essential part of the hydraulic pressure control circuit of FIG. 13 which provides a reverse gear.

As shown in Table VII and FIG. 21, when the reverse gear is selected, all of the solenoid valves 1011 and 1012 and 1021–1023 take the ON states. However, since there is no line pressure from the second output pressure line 1112 in the reverse (R) range, the second and third duty solenoid valves 1022 and 1023 do not develop any operating pressure. In the reverse (R) range, the first to third duty solenoid valves 1021–1023 are activated, causing the bypass control valve 1004 and low-reverse shift valve 1003 to shift the spools to their left end positions similarly in the first gear in the low-speed (L) range. In such a state, the first duty solenoid valve 1021 develops operating pressure and delivers it as braking pressure to the low-reverse brake (L/R) 45. However, in the reverse (R) range, the manual shift valve 1002 introduces the line pressure into the third output pressure line 1113 and delivers it to the reverse clutch (REV) 42 through the pressure line 1130 via the low-reverse shift valve 1003 with the spool placed in the left end position. In this way, the reverse clutch (REV) 42 and low-reverse brake (L/R) 45 are simultaneously locked. In this instance, since the line pressure is introduced into the third output pressure line 1113 via the manual shift valve 1002 even in the neutral (N) range, the reverse clutch (REV) 42 is locked in the neutral (N) range if the low-reverse shift valve 1003 has placed the spool in the left end position.

The hydraulic pressure control circuit 1000 is equipped with a fail-safe feature that, in an event that either one of the solenoid valves 1011 and 1012 falls into inoperative conditions due, for instance, to electrical breakdowns, it detects the breakdown and deactivates another solenoid valve so as to allow the reverse gear to be available. For example, if the second solenoid valve 1012 has become inoperative, the pilot pressure is not delivered to the low-reverse shift valve 1103 through the pressure lines 1106 and 1108 via the bypass control valve 1004, so as to allow the low-reverse shift valve 1103 to shift the spool to the right end position, thereby disconnecting communication not only between the third output pressure line 1113 and reverse clutch pressure line 1130 but between the first duty solenoid valve 1021 and low reverse pressure line 1116. This makes the reverse gear unavailable. In such an event, the controller 1200 detects the breakage based, for instance, on a fact that a predetermined reduction rate is not provided in the reverse range, and provides a signal to the first solenoid valve 1011 for deactivation of the first solenoid valve 1011.

Figure 22:
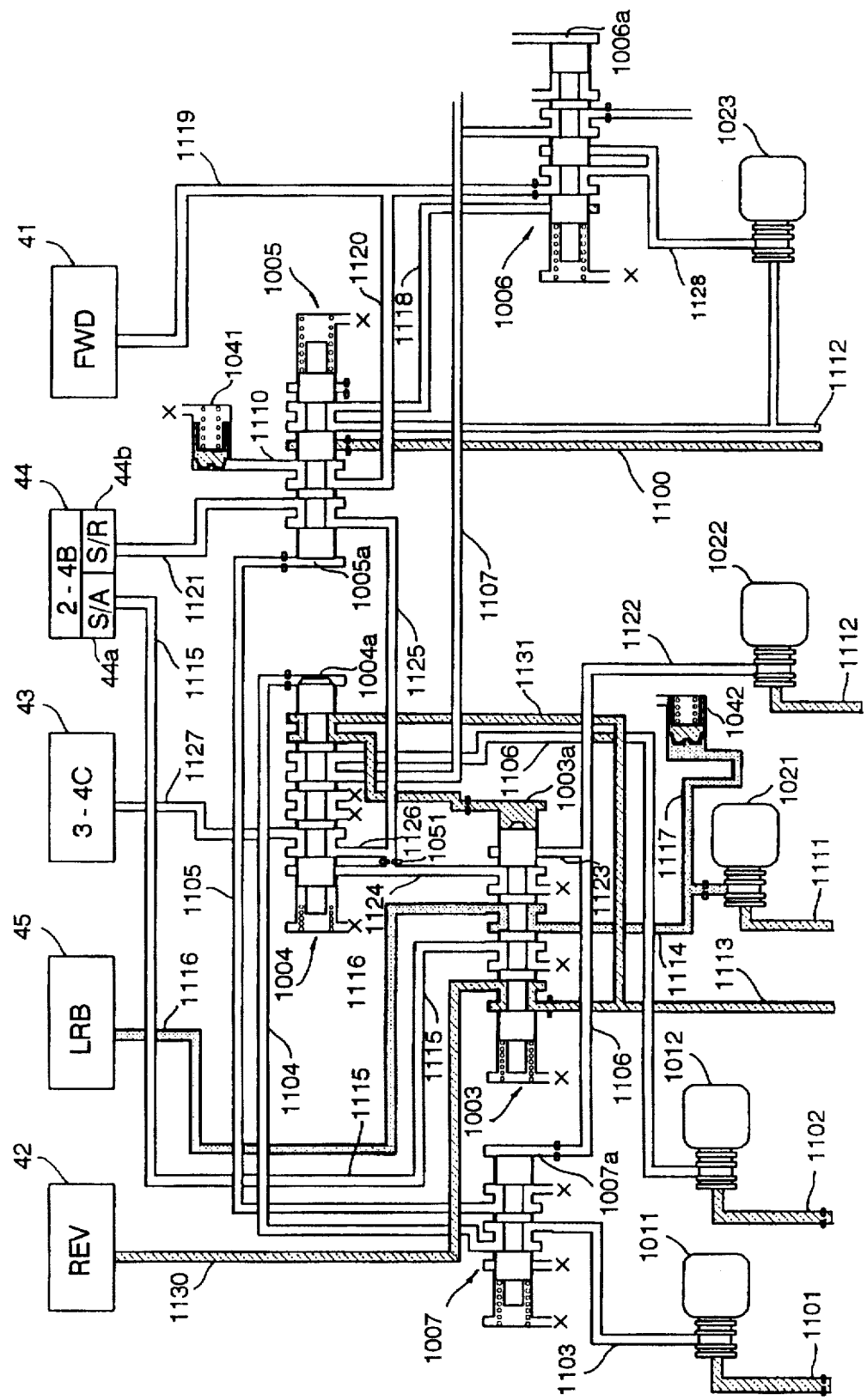
FIG. 22 is an enlarged view of an essential part of the hydraulic pressure control circuit of FIG. 13 which provides fail-safe control for the reverse gear.

Resultingly, as shown in FIG. 22, when such a signal is provided and deactivates the first solenoid valve 1011, the bypass control valve 1004 shifts the spool to the right end position so as to restore communication between the pressure line 1131 branching off from the third output pressure line 1113 and pressure line 1108 and to direct the line pressure to the low-reverse valve 1003 at the control port 1003a as pilot pressure. Consequently, the low-reverse shift valve 1003 forces the spool to the left end position, so as to bring the third output pressure line 1113 and first duty solenoid valve 1021 into communication with the reverse clutch pressure line 1130 and low-reverse pressure line 1116, respectively, thereby causing both reverse clutch (REV) 42 and low-reverse brake (LRB) 45 to lock and create the reverse gear.

Similarly, if the first solenoid valve 1011 falls into inoperative conditions due, for instance, to electrical breakdowns, the hydraulic pressure control circuit 1000 detects the breakdown and deactivates the second solenoid valve 1012 so as to maintain the reverse gear available.

Figure 23:
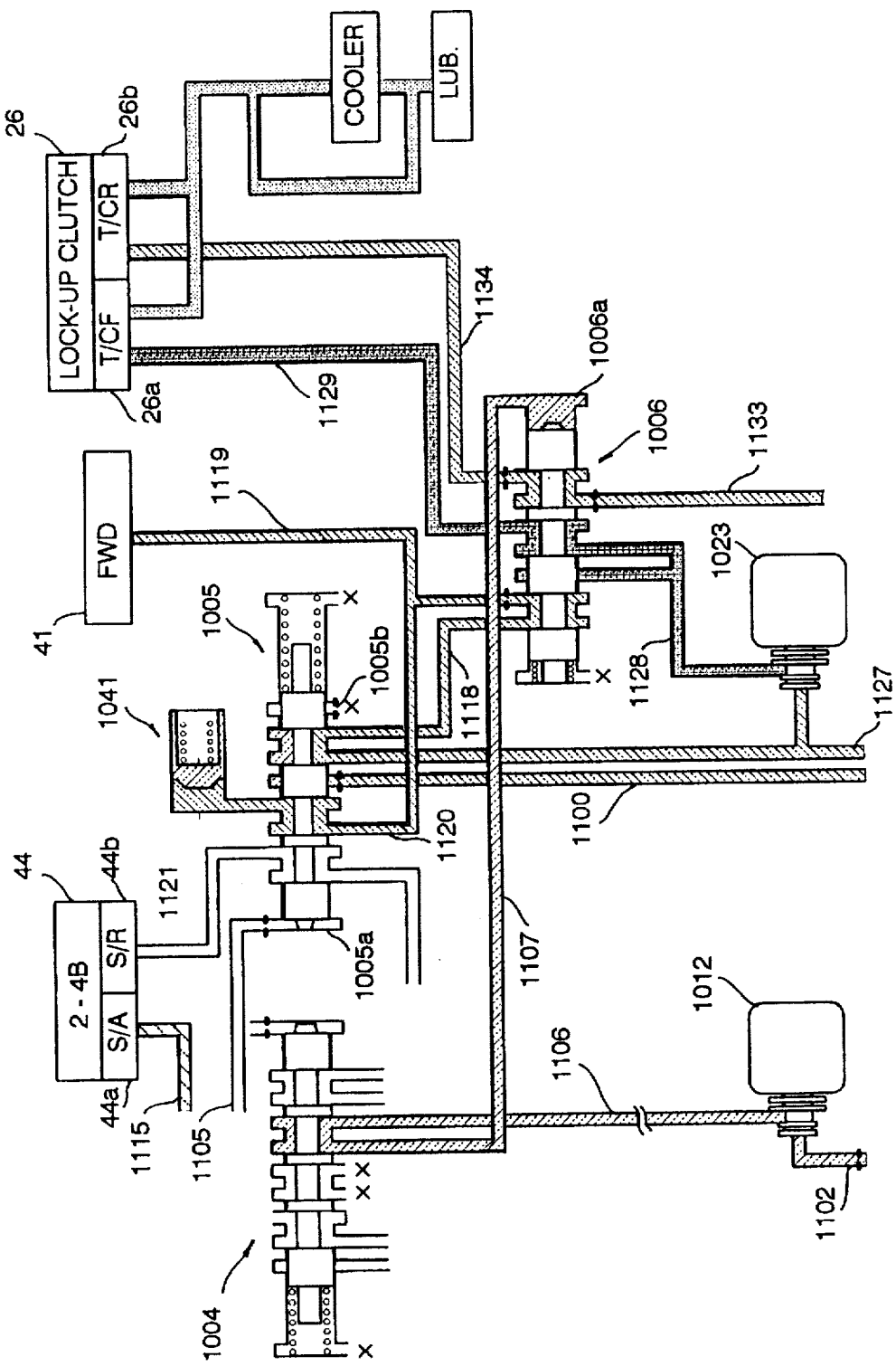
FIG. 23 is an enlarged view of an essential part of the hydraulic pressure control circuit of FIG. 13 which provides lock-up control in the second gear.

As shown in FIG. 23, when the lock-up control takes place in the second (2) gear, the second solenoid valve 1012 turns ON with a result of supplying the operating pressure to the bypass control valve 1004 through the pressure line 1106. Together, in the second (2) gear, the bypass control valve 1004, which holds the spool in the right end position, delivers the operating pressure to the control port 1006a of lock-up control valve 1006 and forces it to shift the spool to the left end position. Resultingly, while communication is provided between the forward clutch pressure line 1119 and second output pressure line 1112 through the pressure line 1118 via the 3–4 shift valve 1005, the pressure line 1128 downstream from the third duty solenoid valve 1023 is brought into communication with the pressure line 1129 leading to the front pressure chamber 26a (T/CF) of lock-up clutch 26. Together, the converter pressure line 1133 is brought into communication with the rear pressure chamber (T/CR) 26b of lock-up clutch 26 through the pressure line 134.

Resultingly, while the forward clutch (FWD) 41 is held locked with the operating pressure supplied from the pressure lines 1112 and 1118, the lock-up clutch 26 is locked or controlled to allow to slip according to the operating pressure in the front pressure chamber (T/CF) 26a regulated by the third duty solenoid valve 1023. During the lock-up control, the lock-up clutch 26 is filled with the converter pressure in the rear pressure chamber ((T/CR) 26b.

Figure 24:
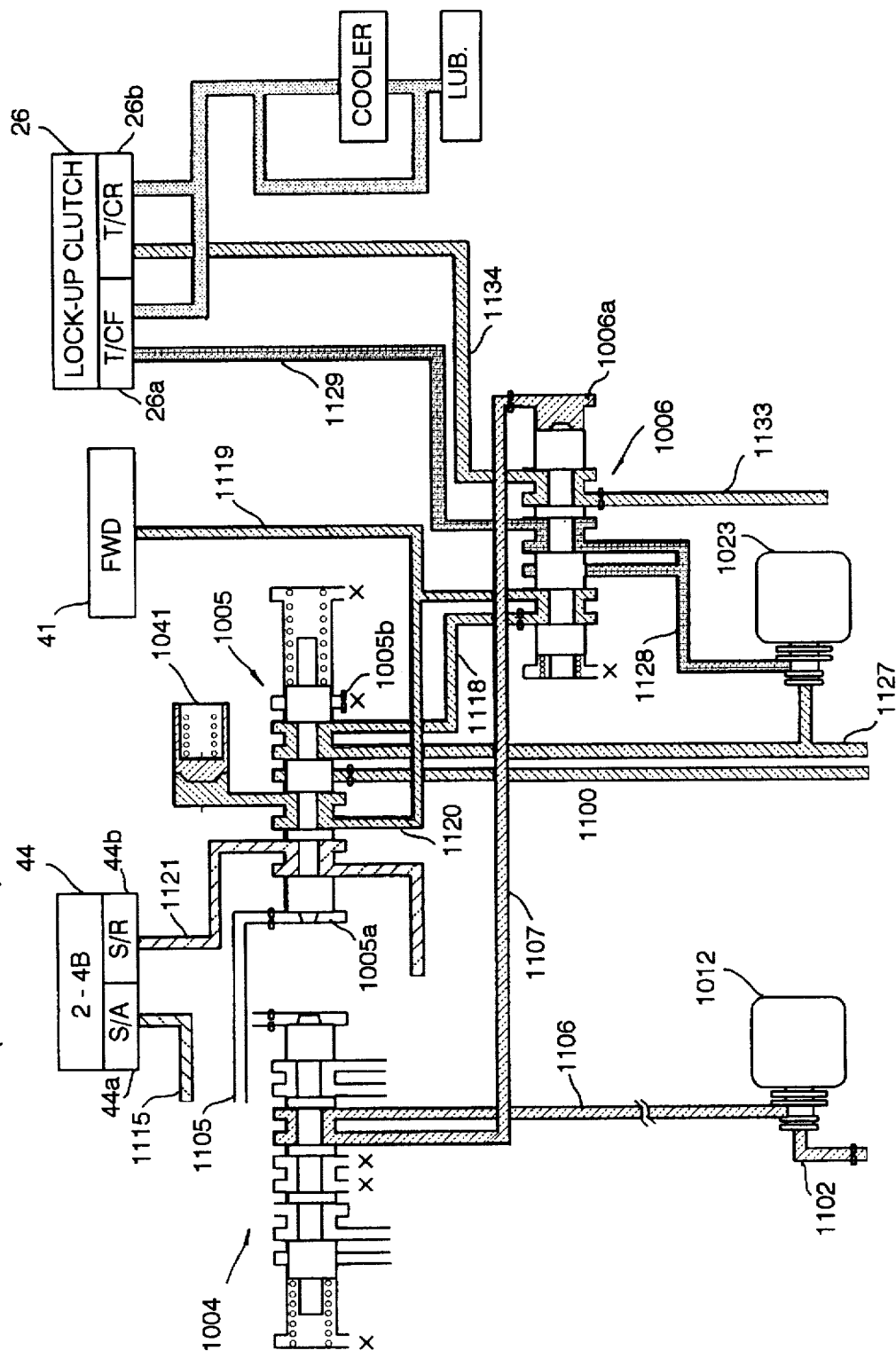
FIG. 24 is an enlarged view of an essential part of the hydraulic pressure control circuit of FIG. 13 which provides lock-up control in the third gear.

The lock-up control is made in the same manner in the third (3) gear as in the second (2) gear. As shown in FIG. 24, the second solenoid valve 1012 turns ON, causing the lock-up control valve 1006 to shift the spool to the left end position. Resultingly, while the forward clutch 41 is held locked with the operating pressure from the pressure line 1112, the lock-up clutch 26 is locked or controlled to slip according to the operating pressure in the front pressure chamber (T/CF) 26a regulated by the third duty solenoid valve 1023. During the lock-up control, the lock-up clutch 26 is filled with the converter pressure in the rear pressure chamber ((T/CR) 26b through the pressure lines 1113 and 1114.

Figure 25:
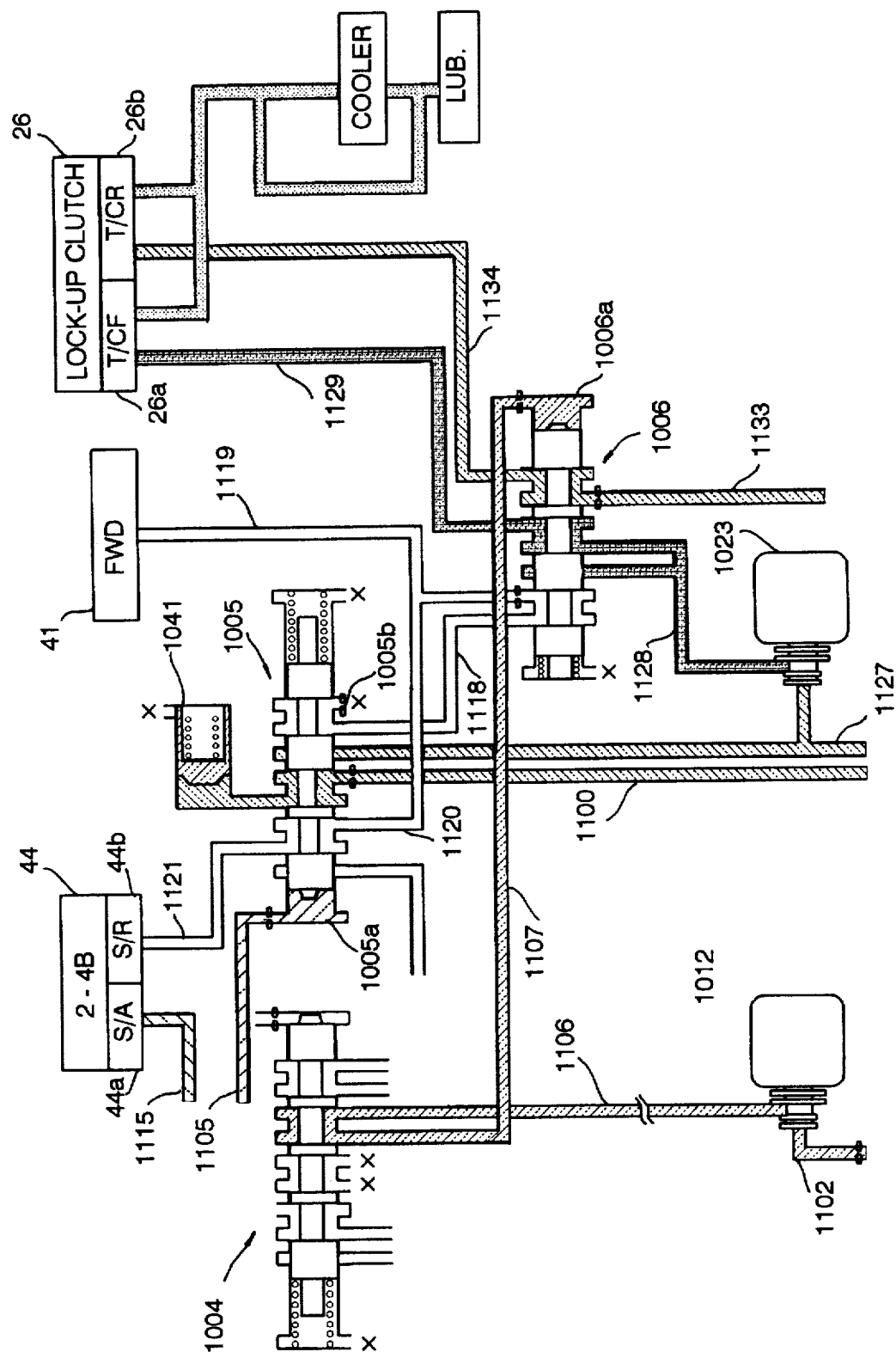
FIG. 25 is an enlarged view of an essential part of the hydraulic pressure control circuit of FIG. 13 which provides lock-up control in the fourth gear.

As shown in FIG. 25, when the lock-up control takes place in the fourth (4) gear, the second solenoid valve 1012 turns ON, causing the lock-up control valve 1006 to shift the spool to the left end position. As a result, the lock-up clutch 26 is locked or controlled to slip according to the operating pressure in the front pressure chamber (T/CF) 26a regulated by the third duty solenoid valve 1023. During the lock-up control, the lock-up clutch 26 is filled with the converter pressure in the rear pressure chamber ((T/CR) 26b through the pressure lines 1133 and 1134. In this instance, while the 3–4 shift valve 1005 thus operated brings the forward clutch pressure line 1119 into communication with the servo release pressure line 1121 through the pressure line 1120, the lock-up control valve 1006 with the spool placed in the right end position provides communication between the forward clutch pressure line 1119 and the drain port 1005b of 3–4 shift valve 1005 through the pressure line 1118 so as to drain the forward clutch pressure line 1119. As a result, when the lock-up control starts in the fourth(4) gear, there occurs a change in operative condition from discharging the forward clutch pressure and servo release pressure through the third duty solenoid valve 1023 to draining them through the 3–4 shift valve 1005, through which the forward clutch 41 and 2–4 brake 44 are held unlocked and locked, respectively.

In regard to the hydraulic pressure control system 1000 of this embodiment, the utilization is made of the third duty solenoid valve 1023 common to the forward clutch 41 and lock-up clutch 26 and selectively controls locking and unlocking of these forward clutch 41 and lock-up clutch 26 according to operative positions of the lock-up control valve 1006. While the third duty solenoid valve 1023 controls the lock-up control valve 1006 in the third (3) gear or in the fourth (4) gear, it allows the line pressure in the pressure line 1112 to be introduced into the forward clutch 41 through the pressure lines 1118 and 1119 via the 3–4 shift valve 1005 and lock-up control valve 1006, holding the forward clutch 41 locked.

In the fourth (4) gear, the third shift valve 1005 brings its drain port 1005b into communication with the pressure line 1118 so as thereby to drains the forward clutch 41 and shuts down the line pressure 1112 through which the line pressure is introduced as control source pressure, unlocking the forward clutch 41 perfectly to hold the automatic transmission in the fourth (4) gear. Even in the condition, the third duty solenoid valve 1023 is effective in controlling the lock-up clutch 26. That is, in the hydraulic pressure control circuit 1000, the third duty solenoid valve 1023, 3–4 shift valve 1005, lock-up control valve 1006, and pressure lines 1112 and 1118 are just the same in function as the second duty solenoid valve 66, first shift valve 56, lock-up control valve 59, and pressure lines 112 and 135 in the hydraulic pressure control circuit 50, respectively, with the same effects as in the pervious hydraulic pressure control circuit 50.

Figure 26:
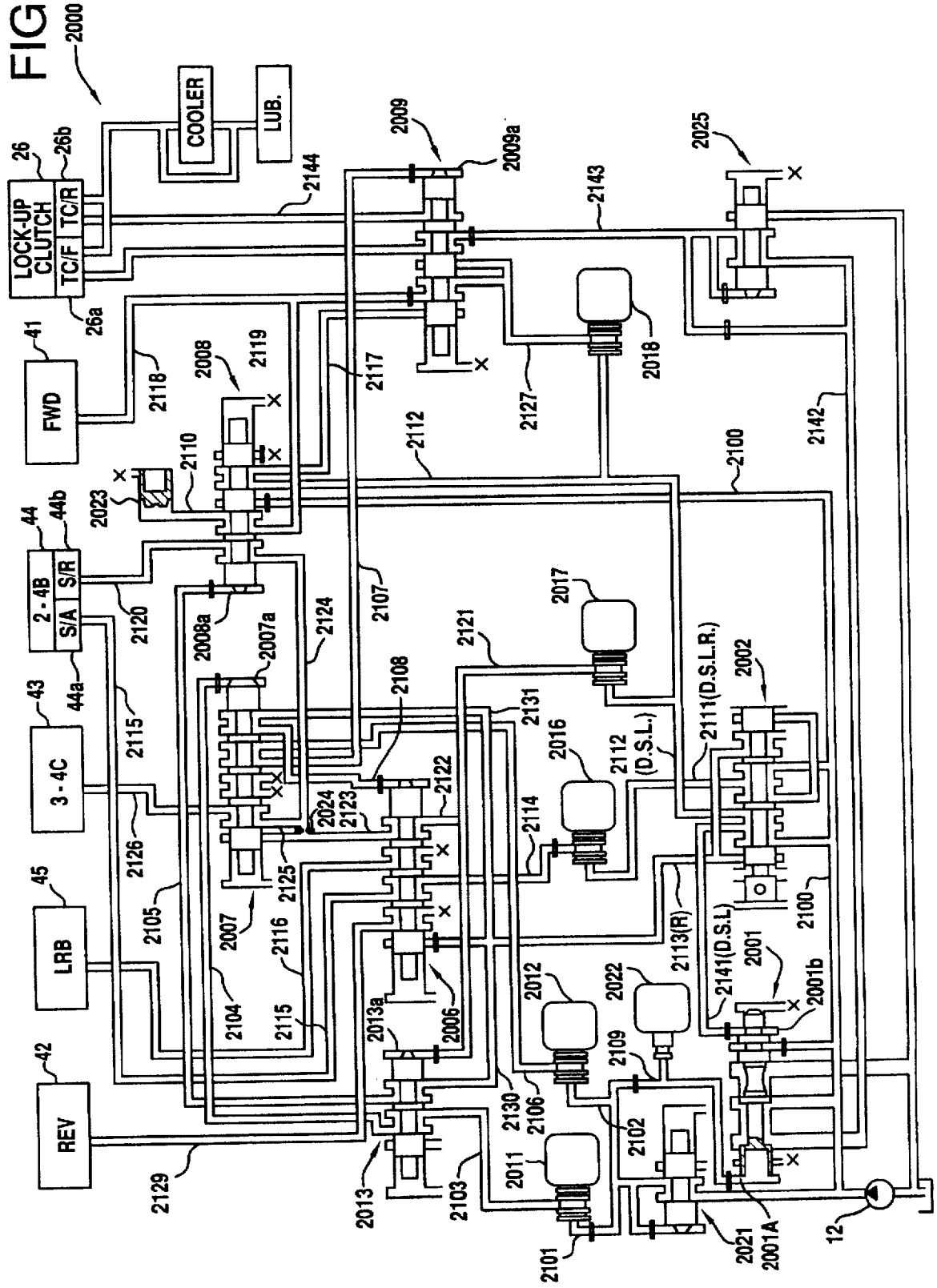
FIG. 26 is a hydraulic pressure control circuit incorporated in the automatic transmission according to a further preferred embodiment of the present invention.

FIG. 26 shows a basic structure of a hydraulic pressure control circuit 2000 in accordance with a further embodiment of the present invention, in which friction coupling elements and various valves per se are the same in structure and operation as those in the previously described hydraulic pressure control circuits. The hydraulic pressure control circuit 2000 includes various valves as essential elements. The valves includes at least a regulator valve 2001 for generating a line pressure, a manual shift valve 2002 for shifting ranges of the automatic transmission 10 according to manual range selections through a shift lever, a low reverse shift valve 2006 for switching pressure lines leading to the friction coupling elements 41–45 during gear shifts, a bypass control valve 2007, a 3–4 shift valve 2008, a lock-up control valve 2009, first and second solenoid solenoid valves 2011 and 2012 for causing these valves 2006–2009, a relay valve 2013 for changing destination of operating pressure provided by means of the first and second solenoid solenoid valves 2011 and 2012, and first to third duty solenoid valves 2016–2018 for generating, regulating and discharging and supplying operating pressure relating to the friction coupling elements 41–45. Those solenoid valves 2011, 2012 and 2016–1018 are of a three-way type having operating modes, namely a communication mode where hydraulic pressure is allowed to flow in a pressure line from the upstream side to the downstream side and vice versa and a drain mode where hydraulic pressure is drawn from the downstream pressure line. In the drain mode, the valve shuts off its related upstream pressure line. Each of the solenoid valves 2011 and 2012 opens the upstream and downstream pressure lines when it turns ON; and each of the duty solenoid valves 2016–2018 provides communication between its upstream and downstream pressure lines when it turns OFF or operates at a duty rate of 0%. Further, each duty solenoid valve 2016–2018 regulates upstream pressure according to a duty rate and delivers it as downstream pressure. Each solenoid valve is the same in structure and operation as that in the hydraulic pressure control circuit 1000 previously described.

The regulator valve 2001 regulates operating pressure discharged by the oil pump 12 to a specified level of line pressure which in turn is delivered to the manual shift valve 2002 through a main pressure line 2100 and also to a solenoid reducing valve (which is hereafter referred to simply as a reducing valve) 2021 and the 3–4 shift valve 2008. The line pressure is reduced by the reducing valve 2021 to a fixed pressure level and then, delivered to both first and second solenoid solenoid valves 2011 and 2012 through pressure lines 2101 and 2102, respectively. When the first solenoid solenoid valve 2011 is ON, the fixed level of line pressure is directed thereby to the relay valve 2013 through a pressure line 2103 and, when the relay valve 2013 holds its spool in the right end position as viewed in FIG. 26, further directed to the control port 2007a of bypass control valve 2007 as pilot pressure through a pressure line 2104. As a result, the bypass control valve 2007 shifts its spool to the left end position as viewed in FIG. 26. On the other hand, when the relay valve 2013 holds the spool in the left end position, the fixed level of line pressure is delivered to the control port 2008a of 3–4 shift valve 2008 as pilot pressure through a pressure line 2105 and forces the 3–4 shift valve 2008 to shift the spool to the right end position.

When the second solenoid valve 2012 is ON, the fixed level of line pressure from the reducing valve 2021 is delivered to the bypass control valve 2007 through a pressure line 2106 and, when the bypass control valve 2007 holds its spool in the right end position, further directed to the control port 2009a of lock-up control valve 2009 as pilot pressure through a pressure line 2107. As a result, the line pressure causes the lock-up control valve 2009 to shift the spool to the left end position. On the other hand, when the bypass control valve 2007 holds the spool in the left end position, the fixed level of line pressure is delivered to the control port 2006a of low-reverse shift valve 2006 as pilot pressure through a pressure line 2108 and forces the low-reverse shift valve 2006 to shift the spool to the left end position.

Further, the fixed level of line pressure from the reducing valve 2021 is also delivered to the regulation port 2001a of regulator valve 2001 through a pressure line 2109. In this instance, the fixed level of line pressure is regulated according to, for instance, engine load by means of a linear solenoid valve 2022 installed in the pressure line 2109. In this way, the line pressure is regulated according to engine load by means of the regulator valve 2001. The main pressure line 2100 leading to the 3–4 shift valve 2008 is held in communication with an accumulator 2023 through a pressure line 2110 when the 3–4 shift valve 2008 holds its spool in the right end position, so as thereby to introduce the line pressure into the accumulator 2023.

The line pressure delivered to the manual shift valve 2002 through the main pressure line 2100 is introduced into a first output pressure line 2111 and a second output pressure line 2112 in each of forward ranges, i.e. the drive (D) range, slow speed (S) range and low speed (L) range; into the first output pressure line 2111 and a third output pressure line 2113 in the reverse (R) range; and into the third output pressure line 2113 in the neutral (R) range. The first output pressure line 2111 leads for delivery of the line pressure to the first duty solenoid valve 2016 as control source pressure. The first duty solenoid valve 2016 leads at its downstream side to the low reverse shift valve 2006 through a pressure line 2114 and, when the low reverse shift valve 2006 holds the spool in the right end position, further leads to the servo apply pressure chamber 44a of 2-4 brake 44 through the servo apply pressure line 2115. The second output pressure line 2112 leads for the supply of line pressure to both second duty solenoid valve 2017 and third duty solenoid valve 2018 as control source pressure, the first duty solenoid valve 1021 and further leads to the 3-4 shift valve 2008. When the second output pressure line 2112, which leads to the 3-4 shift valve 2008, holding the spool in the left end position, it further leads to the lock-up shift valve 2009 through the pressure line 2117 and, when the lock-up shift valve 2009 holds the spool in the left end position, further leads to the pressure chamber of forward clutch 41 through the pressure line 2118. A pressure line 2119 branching off from the forward clutch pressure line 2118 leads to the 3-4 shift valve 2008 which in turn the 3-4 shift valve 2008 holds the spool in the left end position, selectively provides communication of the pressure line 2119 with the accumulator 2023 through the pressure line 2110 when holding the spool in the right end position and communication of the pressure line 2119 with the servo release pressure chamber 44b of 2-4 brake 44 through the servo release pressure line 2120.

The second duty solenoid valve 1022, which is supplied with control source pressure through the second output pressure line 2112, leads at its downstream side to the control port 2013a of relay valve 2013 through a pressure line 2121 and supplies pilot pressure with which the relay valve 2013 is forced to shift its spool to the left end position. A pressure line 2122 branching off from the pressure line 2121 leads to the low-reverse shift valve 2006 which further leads to the pressure line 2123 when holding the spool in the right end position. Branching off from the pressure line 2124 which branches off from the pressure line 2123 through an orifice 2024 is a pressure line 2125 which in turn leads to the bypass control valve 2007. The pressure line 2125 further leads to the pressure chamber of 3-4 shift valve 2008 when the bypass control valve 2007 holds the spool in the right end position. Further, the pressure line 2123 leads directly to the bypass control valve 2007 which in turn provides communication of the pressure line 2123 with the pressure line 2124 through the pressure line 2125, when holding the spool in the left end position.

The third duty solenoid valve 2028, which is supplied with control source pressure through the second output pressure line 2112, leads at the downstream side to the lock-up control valve 2009 through a pressure line 2127. The lock-up control valve 2009 selectively provides communication of the third duty solenoid valve 2018 with the forward clutch pressure line 2118 when holding the spool in the right end position and communication of the third duty solenoid valve 2018 with the front pressure chamber 26a of lock-up clutch 26 through a pressure line 2128 when holding the spool in the left end position.

The third output pressure line 2113 leads to the low reverse shift valve 2006 and delivers the line pressure to it. The low reverse shift valve 2006 directs the line pressure to the pressure chamber of reverse clutch 42 through a reverse clutch pressure line 2129 when holding the spool in the left end position. A pressure line 2130 branching off from the third output pressure line leads to the relay valve 2013 which in turn deliver the line pressure to the control port 2008a of 3-4 shift valve 2008 as pilot pressure when holding the spool in the right end position so as thereby to force the 3-4 shift valve to shift the spool to the right end position. A pressure line 2131 branching off from the third output pressure line 2113 leads to the bypass control valve 2007 which in turn delivers the line pressure to the control port 2006a of low reverse shift valve 2006 through the pressure line 2108 as pilot pressure, when holding the spool in the right end position, so as thereby to force the low reverse shift valve 2006 to shift the spool to the left end position. As well as the first to third output pressure lines 2111-2113, a pressure line 2124 extends from the manual shift valve 2002 and delivers the line pressure to the reducing port 2001b of regulator valve 2001 in each of the forward (D, S and L) ranges. Consequently, the line pressure is regulated to a level lower in these forward ranges than in the reverse (L) range.

The hydraulic pressure control circuit 2000 is further provided with a converter relief valve 2025 which in turn regulates the operating pressure introduced from the regulator valve 2001 through a pressure line 2142 to a fixed level and delivers it to the lock-up control valve 2009 through a pressure line 2143. The fixed level of operating pressure is directed selectively to the front pressure chamber 26a of lock-up clutch 26 through the pressure line 2128 when the lock-up control valve 2009 shifts the spool to the right end position and the rear pressure chamber 26b of lock-up clutch 26 through a pressure line 2144 when the lock-up control valve 2009 shifts the spool to the left end position.

The lock-up clutch 26 is locked with the rear pressure chamber (T/CF) 26b filled with a fixed level of operating pressure and unlocked with the front pressure chamber (T/CF) 26b filled with a fixed level of operating pressure. Since the lock-up clutch 26 is locked, the third duty solenoid valve 2018 develops operating pressure and directs it to the rear pressure chamber 26b of lock-up clutch 26 through the lock-up control valve 2009, the locking force is proportional to the operating pressure.

In the hydraulic pressure control circuit 2000, the third duty solenoid valve 2018, 3-4 shift valve 2008, lock-up control valve 2009, and pressure lines 2112 and 2117 are just the same in function as the second duty solenoid valve 66, first shift valve 56, lock-up control valve 59, and pressure lines 112 and 135 in the hydraulic pressure control circuit 50, respectively, with the same effects as in the pervious hydraulic pressure control circuit 50.

It is to be understood that although the present invention has been described with respect to preferred embodiments thereof, various other embodiments and variants including various combinations and arrangements of components, may occur to those skilled in the art, which are within the spirit and scope of the present invention, and such other embodiments and variants are intended to be covered by the following claims.

What is claimed is:

1. A hydraulic pressure control system for an automatic transmission of the type having a torque converter and a plurality of friction coupling elements which include at least a specific friction coupling element unlocked in specific forward gears and locked in gears other than the specific forward gears and a lock-up clutch for mechanically coupling an input shaft and an output shaft of said torque converter together and are selectively operated with hydraulic pressure for providing desired gears, said hydraulic pressure control system comprising:

pressure control means for controlling operating pressure with which said specific friction coupling element is locked;

a lock-up control valve for connecting and disconnecting pressure communication between said pressure control means and said lock-up clutch;

control source pressure supply means for introducing control source pressure into said specific friction coupling element as said operating pressure while said lock-up control valve connects pressure communication between said pressure control means and said lock-up clutch; and switching means for disconnecting communication of said control source pressure from said specific friction coupling element to unlock said specific friction coupling element while said lock-up control valve connects pressure communication between said pressure control means and said lock-up clutch before a gear shift from one of said specific forward gears to a gear other than said specific forward gears.

2. A hydraulic pressure control system as defined in claim 1, wherein said pressure control means discharges said operating pressure from said specific friction coupling element to unlock said specific friction coupling element while said lock-up control valve disconnects pressure communication between said pressure control means and said lock-up clutch before a gear shift from said specific forward gear to a gear other than said specific forward gear.

3. A hydraulic pressure control system as defined in claim 1, wherein said lock-up control valve disconnects pressure communication to said pressure control means from said lock-up clutch during a gear shift from a gear other than said specific forward gear to said specific forward gear.

4. A hydraulic pressure control system as defined in claim 1, wherein said specific friction coupling element comprises a forward clutch locked in first, second and third gears and unlocked in a fourth gear, and said lock-up clutch is locked in said second gear, said third gear and said fourth gear according to specified driving conditions.

5. A hydraulic pressure control system for an automatic transmission of the type having a torque converter and a plurality of friction coupling elements which are selectively locked and unlocked with hydraulic pressure to change transmission paths through which driving power from a power source is transmitted, said friction coupling elements including at least first and second specific friction coupling elements, said hydraulic pressure control system comprising:

first pressure generating means for generating a specified level of pressure;

second pressure generating means for regulating and delivering said specified level of pressure to one of said first and second specific friction coupling elements as operating pressure;

first switching means for switching pressure communication of said operating pressure from one of said first specific friction coupling element and said second friction coupling element to another and vice versa; and second switching means for connecting pressure communication of said specified level of pressure to said first specific friction coupling element while said first switching means connects pressure communication of said operating pressure with said second specific friction coupling element.

6. A hydraulic pressure control system as defined in claim 5, wherein said first specific friction coupling element comprises a forward clutch locked in first, second and third gears and unlocked in a fourth gear, and said second specific friction coupling element is locked in said second gear, third and fourth gears according to specified driving conditions.

7. A hydraulic pressure control system as defined in claim 5, wherein each of said first and second pressure switching means comprises a spool valve having a spool shiftable between a first operative position where communication of said operating pressure is connected to said first specific friction coupling element and a second operative position where communication of said operating pressure is connected to said second specific friction coupling element while communication of said specified level of pressure is connected to said first specific friction coupling element, and a return spring for forcing said spool to one of said first and second operative positions, said spool being applied with control pressure so as to shift to another of said first and second operative positions against said return spring.

8. A hydraulic pressure control system as defined in claim 5, and further comprising third switching means for discharging said operating pressure from said first specific friction coupling element to unlock said first specific friction coupling element while first switching means connects communication of said operating pressure to said second specific friction coupling element, and for disconnecting communication of said specified level of pressure to said first specific friction coupling element.

9. A hydraulic pressure control system as defined in claim 8, wherein said third switching means comprises a spool valve having a spool shiftable between a first operative position where communication of said specified level of pressure is connected to said first specific friction coupling element and a second operative position where, while said operating pressure is discharged from said first specific friction coupling element, communication of said specified level of pressure is disconnected from said first specific friction coupling element.

10. A hydraulics pressure control system as defined in claim 5, wherein said first pressure generating means comprises an oil pump for providing hydraulic pressure and a regulator valve for regulating said hydraulic pressure to said specified level of pressure.

11. A hydraulic pressure control system as defined in claim 5, wherein said second pressure generating means comprises a duty solenoid valve for providing said specified level of pressure with a specified changing characteristic.

12. A hydraulic pressure control system for an automatic transmission of the type having a plurality of friction coupling elements which are selectively locked and unlocked with hydraulic pressure for changing transmission paths through which driving power from a power source is transmitted, said friction coupling element including at least first and second specific firction coupling elements, said hydraulic pressure control system comprising:

first pressure generating means for generating a specified level of pressure;

second pressure generating means for regulating and delivering said specified level of operating pressure to said first and second specific friction coupling elements as operating pressure;

a first spool valve having a first spool shiftable between a first operative position where communication of said operating pressure is connected to said first specific friction coupling element and a second operative position where communication of said operating pressure is connected to said second specific friction coupling element while communication of said specified level of pressure is connected to said first specific friction coupling element, and a first return spring for forcing said first spool to one of said first and second operative positions of said first spool valve, said first spool being applied with control pressure so as to shift to another of said operative positions of said first spool valve against said first return spring; and a second spool valve having a second spool shiftable between a first operative position where communication of said specified level of pressure is connected to said first specific friction coupling element and a second operative position where communication of said specified level of pressure is disconnected from said second spool valve while discharging said specified level of pressure from the first specific friction coupling element, and a second return spring for forcing said second spool to one of said first and second operative positions of said second spool valve, said second spool being applied with control pressure so as to shift to another of said operative positions of said second spool valve against said second return spring.

13. A hydraulic pressure control system as defined in claim 12, wherein said first specific friction coupling element comprises a forward clutch locked in first, second and third forward gears and unlocked in a fourth forward gear, and said second specific friction coupling element comprises a lock-up clutch for mechanically coupling input shaft and output shafts of a torque converter in said second, third and forth forward gears according to specified driving conditions.

14. A hydraulic pressure control system as defined in claim 12, wherein said first pressure generating means comprises an oil pump for providing hydraulic pressure and a regulator valve for regulating said hydraulic pressure to said specified level of pressure.

15. A hydraulic pressure control system as defined in claim 12, wherein said second pressure generating means comprises a duty solenoid valve for providing said specified level of pressure with a specified changing characteristic.

* * * * *